(12) United States Patent
Fuchino et al.

(10) Patent No.: US 8,416,536 B2
(45) Date of Patent: Apr. 9, 2013

(54) HEAD SUSPENSION AND METHOD OF MANUFACTURING THE HEAD SUSPENSION WITH PARTICULAR ELECTRICAL CONNECTION ARRANGEMENT BETWEEN A PIEZOELECTRIC ELEMENT AND A WIRING MEMBER

(75) Inventors: Hideki Fuchino, Aikoh-gun (JP); Sachie Yamada, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 299 days.

(21) Appl. No.: 12/968,922

(22) Filed: Dec. 15, 2010

(65) Prior Publication Data

US 2011/0141624 A1 Jun. 16, 2011

(30) Foreign Application Priority Data

Dec. 15, 2009 (JP) ................................ P2009-284489

(51) Int. Cl.
*G11B 5/56* (2006.01)

(52) U.S. Cl.
USPC ................... 360/294.4; 360/244.8; 360/245.8

(58) Field of Classification Search ............... 360/294.1, 360/294.3, 294.4, 294.6, 244.2, 244.5, 244.8, 360/245.2, 245.8, 245.9
See application file for complete search history.

(56) References Cited

U.S. PATENT DOCUMENTS

| 7,872,834 | B1 * | 1/2011 | Pokornowski et al. | .... 360/294.4 |
|---|---|---|---|---|
| 8,248,734 | B2 * | 8/2012 | Fuchino | ...................... 360/294.4 |
| 2005/0013056 | A1 * | 1/2005 | Kuwajima et al. | ......... 360/294.4 |
| 2010/0165516 | A1 * | 7/2010 | Fuchino | ...................... 360/294.4 |
| 2011/0051290 | A1 * | 3/2011 | Inoue et al. | ................. 360/244.2 |
| 2011/0216446 | A1 * | 9/2011 | Iriuchijima | ................ 360/294.4 |
| 2011/0249366 | A1 * | 10/2011 | Fujimoto et al. | ........... 360/294.4 |
| 2012/0014017 | A1 * | 1/2012 | Ohnuki et al. | .............. 360/294.1 |
| 2012/0224282 | A1 * | 9/2012 | Hanya et al. | ................ 360/244.2 |
| 2012/0281317 | A1 * | 11/2012 | Fujimoto et al. | ........... 360/294.4 |

FOREIGN PATENT DOCUMENTS

| JP | 2002-050140 | 2/2002 |
|---|---|---|
| JP | 2003-061371 | 2/2003 |

* cited by examiner

*Primary Examiner* — Jefferson Evans
(74) *Attorney, Agent, or Firm* — Jordan and Hamburg LLP

(57) ABSTRACT

A head suspension has a base, a piezoelectric element, a load beam, and a wiring member to supply electric power to the piezoelectric element so that the piezoelectric element deforms to move the load beam relative to the base. The wiring member has a conductive base layer, an insulating layer, and a wiring layer layered in this order. The wiring layer has a wiring electrode. The piezoelectric element has an element electrode. A through hole is formed through the conductive base layer and insulating layer, to expose the wiring electrode to the element electrode. A projection is formed on at least one of the wiring electrode and element electrode, to face the other electrode through the through hole. The projection brings the electrodes into contact with each other and a conductive adhesive joins the electrodes and together.

18 Claims, 18 Drawing Sheets

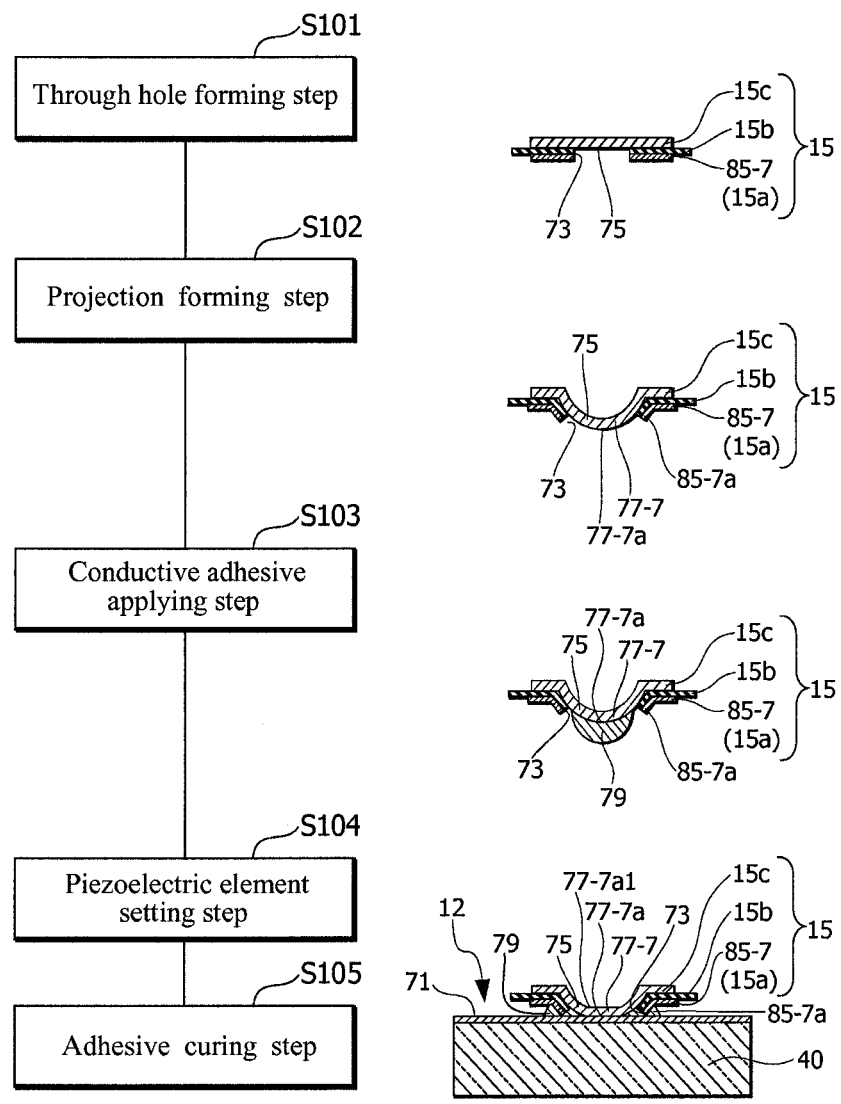

Fig.10
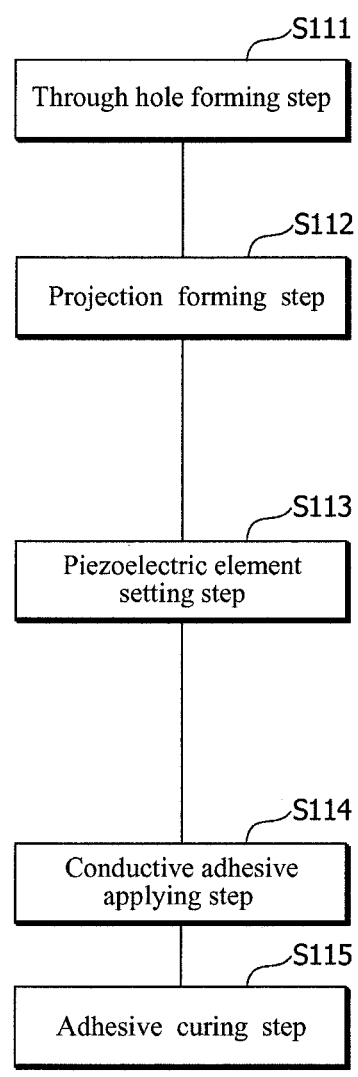
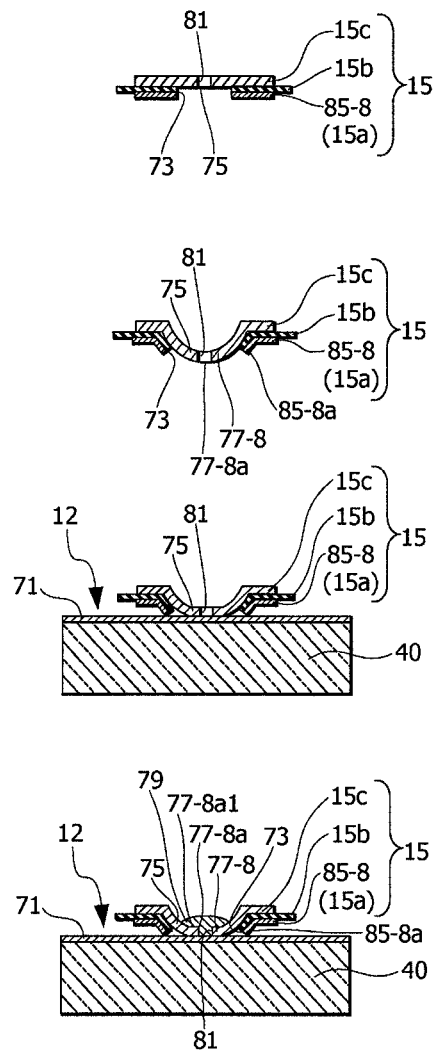

HEAD SUSPENSION AND METHOD OF MANUFACTURING THE HEAD SUSPENSION WITH PARTICULAR ELECTRICAL CONNECTION ARRANGEMENT BETWEEN A PIEZOELECTRIC ELEMENT AND A WIRING MEMBER

BACKGROUND OF THE INVENTION

1. Field of the Invention

The present invention relates to a head suspension for a disk drive installed in an information processing apparatus such as a personal computer and a method of manufacturing the head suspension.

2. Description of Related Art

Small-sized, precision information devices are rapidly advancing, and for use with such devices, needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

To meet the need, Japanese Unexamined Patent Application Publication No. 2002-50140 of this applicant has proposed a head suspension for a disk drive. The head suspension includes a base plate, a connection plate having a hinge thinner than the base plate, a load beam that is provided with a flexure, and a piezoelectric actuator having a pair of piezoelectric elements.

This related art employs a dual actuator system that involves, for a precise positioning purpose, a voice coil motor and the piezoelectric actuator having two piezoelectric elements made of, for example, PZT (lead zirconate titanate).

The piezoelectric actuator in the dual actuator system minutely moves a front end of the load beam in a widthwise direction (sway direction) of the head suspension. Compared with a single actuator system employing only the voice coil motor, the dual actuator system employing the voice coil motor and piezoelectric actuator is capable of more precisely positioning a magnetic head attached to a front end of the head suspension.

An important issue for the head suspension employing the dual actuator system is how to supply power to the piezoelectric element.

One approach to address the issue is disclosed in Japanese Unexamined Patent Application Publication No. 2003-61371. This related art forms a pair of wires and connects one of the wires to a first electrode of the piezoelectric element by wire bonding and the other wire to a second electrode of the piezoelectric element by wire bonding and supplies power through the wires to the piezoelectric element, as illustrated in FIGS. 9 and 10 of the related art.

The wire bonding of this related art, however, applies local stress onto the piezoelectric element to secure bonding strength. Applying local stress onto the piezoelectric element involves a risk of damaging the piezoelectric element. If the wire bonding is carried out moderately to prevent the damage of the piezoelectric element, the bonding strength will be insufficient and deteriorate the reliability of electrical connection.

It is difficult for the related art to prevent the breakage of the piezoelectric element, and at the same time, secure the reliability of electrical connection between the power supply wiring and the piezoelectric element.

SUMMARY OF THE INVENTION

An object of the present invention is to provide a head suspension having wiring connection that is achievable without damaging a piezoelectric element installed in the head suspension and secures reliability of electrical connection to the piezoelectric element and a method of manufacturing such a head suspension.

In order to accomplish the object, a first aspect of the present invention provides a head suspension having a base, a piezoelectric element, a load beam, and a wiring member, the wiring member having a conductive base layer, an insulating layer, and a wiring layer layered in this order to supply electric power to the piezoelectric element so that the piezoelectric element deforms to move the load beam relative to the base in a sway direction. The head suspension includes a wiring electrode formed on the wiring layer of the wiring member, an element electrode formed on the piezoelectric element, a through hole formed through the conductive base layer and insulating layer of the wiring member to expose the wiring electrode to the element electrode, a projection formed on at least one of the wiring electrode and element electrode and facing the other of the wiring electrode and element electrode through the through hole to bring the wiring and element electrodes into contact with each other, and a conductive adhesive joining the electrodes in the contact state together.

A second aspect of the present invention provides a method of manufacturing the head suspension. The method comprise steps of forming the through hole through the conductive base layer and insulating layer of the wiring member, forming the projection on at least one of the wiring electrode and element electrode so that the projection is faceable to the other electrode through the through hole, setting the piezoelectric element on the wiring member so that the element electrode and wiring electrode face each other through the through hole and come in contact with each other through the projection, and joining the wiring electrode and element electrode together with a conductive adhesive.

These aspects of the present invention secure electrical conduction between the wiring member and the piezoelectric element due to the contact with the projection and the join with the conductive adhesive between the wiring and element electrodes. These aspects allow wiring connection work to the piezoelectric element to be achieved without applying local stress onto the piezoelectric element. Accordingly, the wiring connection work to the piezoelectric element is achievable with high reliability without damaging the piezoelectric element.

BRIEF DESCRIPTION OF THE DRAWINGS

FIGS. 1A, 1B, and 1C illustrate a head suspension according to a first embodiment of the present invention, in which FIG. 1A is an exploded back view, FIG. 1B a back plan view, and FIG. 1C an enlarged front plan view illustrating an area around a piezoelectric element of the head suspension;

FIGS. 3A and 3B illustrate a wiring member (flexure) of the head suspension according to the first embodiment, in which FIG. 3A is a perspective view from the piezoelectric element and FIG. 3B a sectional view taken along a line IIIB-IIIB of FIG. 3A with the piezoelectric element;

FIGS. 4A and 4B illustrate a wiring member (flexure) of a head suspension according to a second embodiment of the present invention, in which FIG. 4A is a perspective view from a piezoelectric element and FIG. 4B a sectional view taken along a line IVB-IVB of FIG. 4A with the piezoelectric element;

FIGS. 5A and 5B illustrate a wiring member of a head suspension according to a third embodiment of the present invention, in which FIG. 5A is a perspective view from a piezoelectric element and FIG. 5B a sectional view taken along a line VB-VB of FIG. 5A with the piezoelectric element;

FIGS. 6A and 6B illustrate a wiring member of a head suspension according to a fourth embodiment of the present invention, in which FIG. 6A is a perspective view from a piezoelectric element and FIG. 6B a sectional view taken along a line VIB-VIB of FIG. 6A with the piezoelectric element;

FIG. 9 is a flowchart illustrating a first method of manufacturing a head suspension according to an embodiment of the present invention as well as sectional views corresponding steps of the first method;

FIG. 10 is a flowchart illustrating a second method of manufacturing a head suspension according to an embodiment of the present invention as well as sectional views corresponding steps of the second method;

FIGS. 18A and 18B illustrate a wiring member of a head suspension according to a fifteenth embodiment of the present invention, in which FIG. 18A is a perspective view from a piezoelectric element and FIG. 18B a sectional view taken along a line XVIIIB-XVIIIB of FIG. 18A with the piezoelectric element.

DETAILED DESCRIPTION OF EMBODIMENTS

Embodiments of the present invention will be explained in detail with reference to the drawings. Each embodiment relates to a head suspension employing the dual actuator system that involves a voice coil motor and a piezoelectric actuator. Each embodiment reliably achieves wiring connection to a piezoelectric element installed in a head suspension without damaging the piezoelectric element. For this, each embodiment employs a wiring connection structure including a projection to bring a wiring electrode and an element electrode into contact with each other through a through hole and a conductive adhesive to bond the wiring and element electrodes in the contact state together.

Figure 1A:
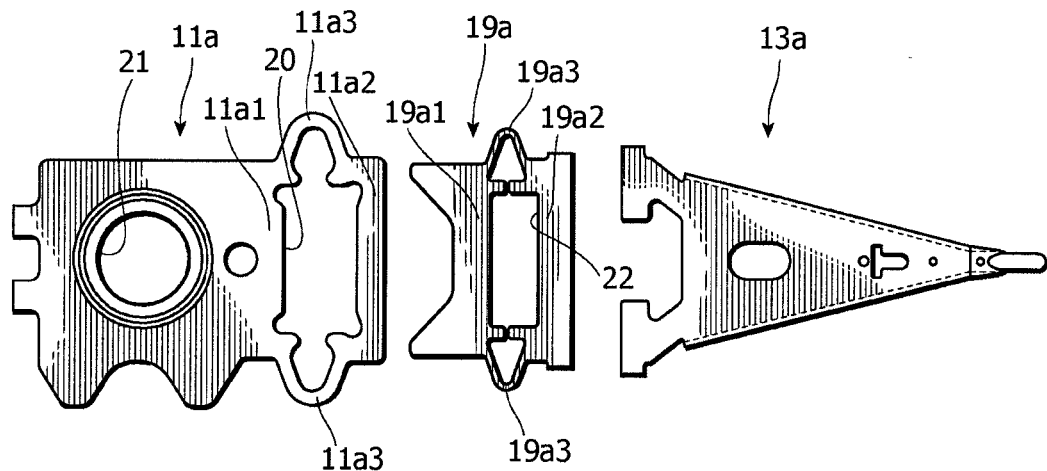
Figure 1B:
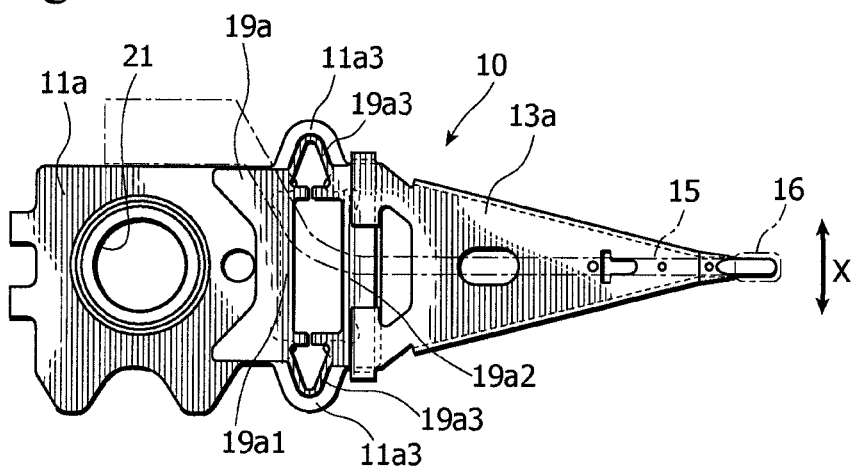
Figure 1C:
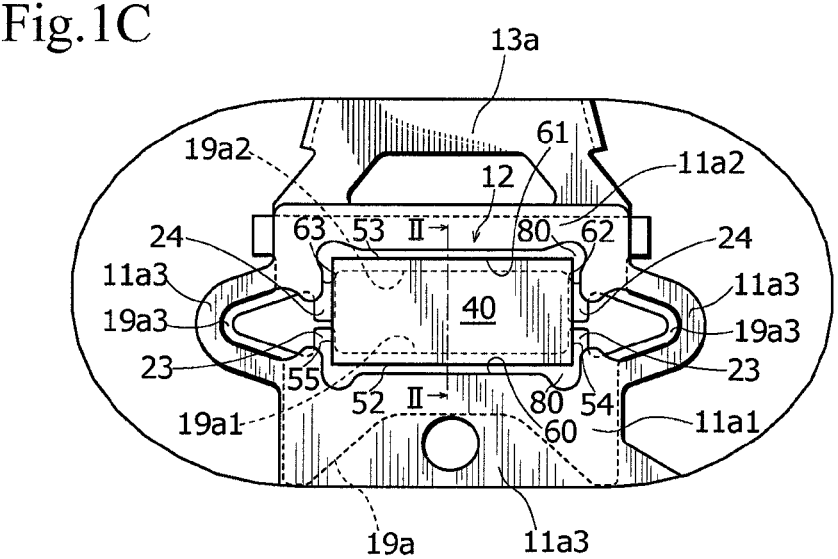
Figure 2:
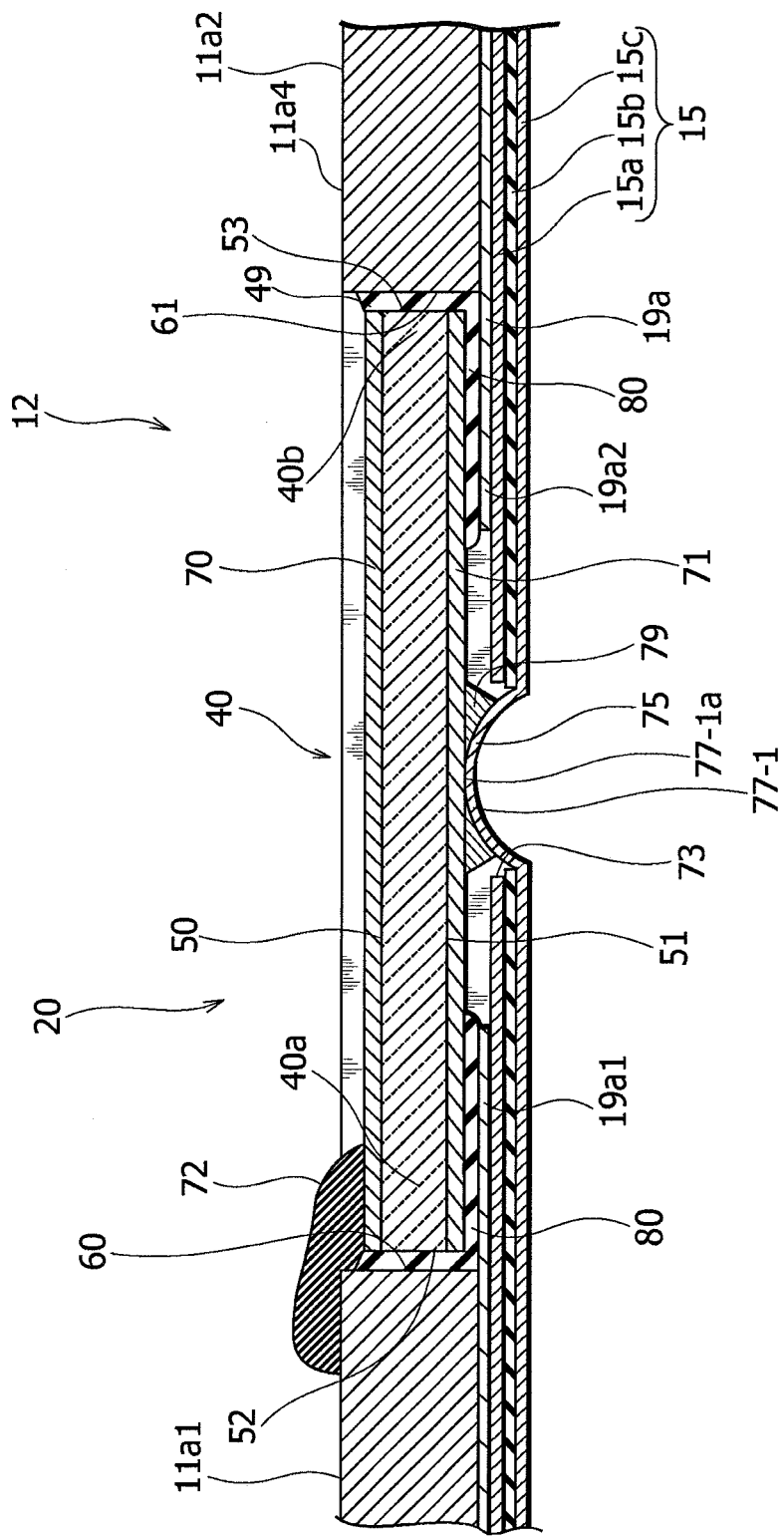
FIG. 2 is a sectional view taken along a line II-II of FIG. 1C.
Figure 3A:
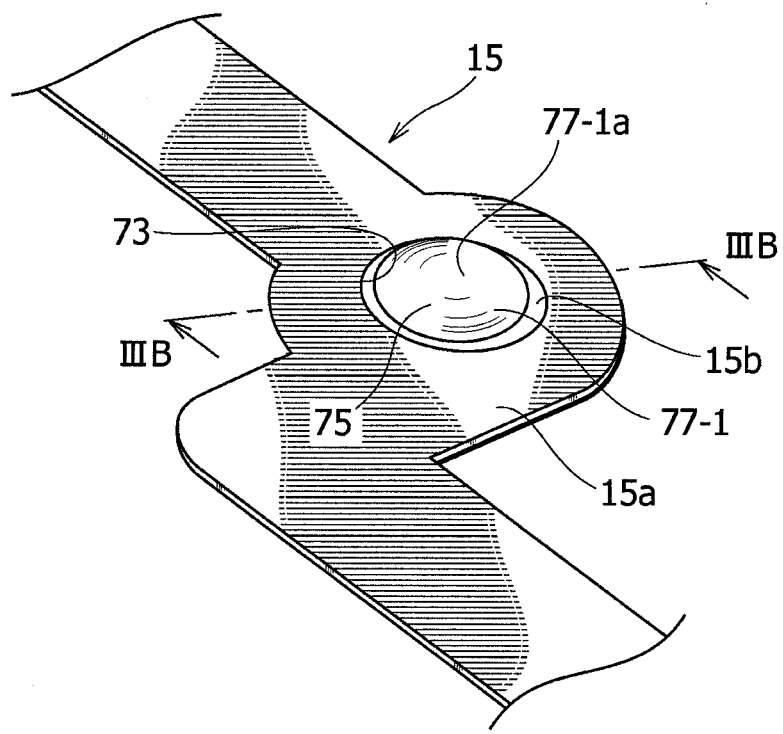
Figure 3B:
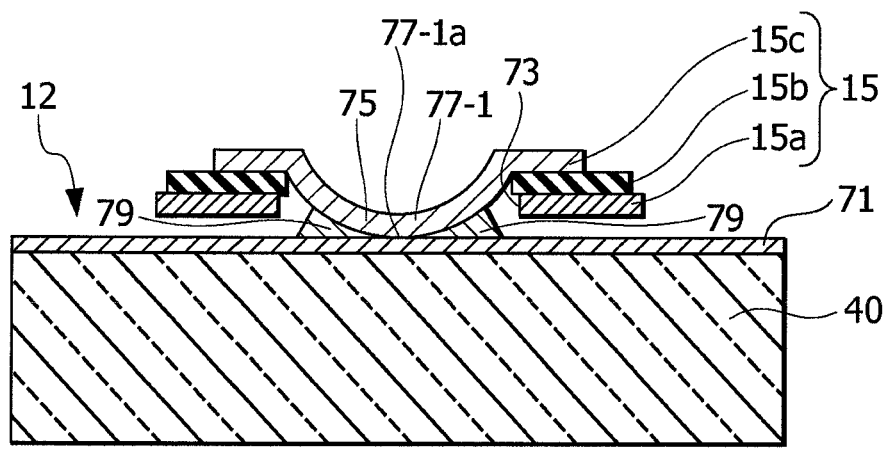

FIGS. 1A to 3B illustrate a head suspension according to the first embodiment of the present invention, in which FIG. 1A is an exploded back view of the head suspension, FIG. 1B a back plan view thereof, FIG. 1C an enlarged front plan view of a piezoelectric element area of the head suspension, FIG. 2 a sectional view taken along a line II-II of FIG. 1C, FIG. 3A a perspective view of a wiring member seen from the piezoelectric element, and FIG. 3B a sectional view taken along a line IIIB-IIIB of FIG. 3A with the piezoelectric element.

In FIGS. 1A to 1C, the head suspension 10 has a base plate 11a, a piezoelectric actuator 12, a load beam 13a, a receiver 19a, and the like.

In the following explanation, the base plate 11a side of the head suspension 10 is referred to as a base end side or a rear side and the load beam 13a side of the head suspension 10 as a front end side or a front side in the longitudinal direction of the head suspension 10. A side of the head suspension 10 opposite to a disk, for which the head suspension 10 is arranged to read and write data, is referred to as a surface side and a side of the head suspension 10 facing the disk as a back side or a bottom side. A side proximal to a center axis of the head suspension 10 is referred to as an inner side and a side distal to the center axis as an outer side. A side on the left of the center axis is referred to as a left side and a side on the right of the center axis as a right side.

In the head suspension 10, the piezoelectric actuator 12 has a piezoelectric element 40 made of, for example, piezoelectric ceramics. The piezoelectric element 40 deforms in response to applied electric power, to move the load beam 13a relative to the base plate 11a as a base so that the front end side of the load beam 13a minutely moves in a sway direction (widthwise direction of the head suspension 10).

The base plate 11a resiliently supports the load beam 13a and is a resilient metal thin plate made of, for example, stainless steel having a thickness in the range of about 150 to 200 μm.

The base plate 11a has an opening 20 and a circular boss 21. The base plate 11a integrally includes a base part 11a1, a front part 11a2, and a pair of links 11a3 extending on each side of the opening 20 and connecting the base part 11a1 and front part 11a2 to each other.

Illustrated in FIGS. 1C and 2, the opening 20 accommodates the piezoelectric element 40. The piezoelectric element 40 is rectangular and is made of, for example, PZT (lead zirconate titanate) that deforms in response to electric power applied thereto.

The base part 11a1 of the base plate 11a is fixed to a front end of an actuator arm (not illustrated) that is turned by a voice coil motor (not illustrated). Each of the links 11a3 has a U-shape and extends outwardly from the opening 20 as illustrated in FIG. 1A. The links 11a3 function to bend the front part 11a2 relative to the base part 11a1 in each sway direction X as illustrated in FIG. 1B.

The load beam 13a has, on its back face, a flexure 15 fixed thereto by, for example, laser spot welding. The load beam 13a applies load onto a magnetic head slider 16 arranged at a front end of the flexure 15. The load beam 13a is a resilient thin plate made of, for example, stainless steel and has a thickness in the range of, for example, about 30 to 150 µm.

The flexure 15 corresponds to a wiring member to supply electric power to the piezoelectric element 40. The flexure 15 is thinner than the load beam 13a and is a precision resilient thin plate made of, for example, stainless steel. The flexure 15 includes a conductive base layer 15a, an insulating layer 15b, and a wiring layer 15c that are successively laid one on another in this order from a side proximal to the receiver 19a, as illustrated in FIG. 2. The flexure 15 is fixed to a predetermined position of the receiver 19a by, for example, laser spot welding.

In the flexure 15, the conductive base layer 15a is a metal thin plate made of, for example, stainless steel. The insulating layer 15b is made of insulating material such as polyimide resin. The wiring layer 15c is made of conductive material such as copper and nickel. The wiring layer 15c supplies power to electrodes 70 and 71 of the piezoelectric element 40 and transmits read and write signals with respect to the magnetic head slider 16.

The receiver 19a is a thin plate made of, for example, stainless steel having a thickness in the range of, for example, 20 to 50 µm.

The receiver 19a has a base part 19a1, a front part 19a2, a pair of links 19a3 to connect the base part 19a1 and front part 19a2 to each other in both lateral sides as illustrated in FIG. 1A. The receiver 19a has an opening 22 that corresponds to and is smaller than the opening 20 of the base plate 11a.

The base part 19a1 of the receiver 19a corresponds to the base part 11a1 of the base plate 11a and is fixed to the back face of the base part 11a1 by, for example, laser spot welding.

The front part 19a2 of the receiver 19a corresponds to the front part 11a2 of the base plate 11a and is fixed to the back face of the front part 11a2 by, for example, laser spot welding. To the back face of the front part 11a2 of the base plate 11a, a base end of the load beam 13a is fixed by, for example, laser spot welding.

Each link 19a3 of the receiver 19a has a U-shape protruding outwardly from an outer side of the piezoelectric element 40. The links 19a3 allow the front part 19a2 to bend in the sway direction X in FIG. 1B relative to the base part 19a1.

The links 19a3 of the receiver 19a are on the inner side of the links 11a3 of the base plate 11a as illustrated in FIGS. 1B and 1C. Namely, according to the first embodiment, the links 19a3 do not overlap the links 11a3.

As illustrated in FIGS. 1C and 2, the piezoelectric element 40 of the piezoelectric actuator 12 has the electrodes 70 and 71 on the top and bottom faces thereof, respectively. The piezoelectric actuator 12 has a thickness in the range of, for example, about 0.07 to 0.20 mm.

The piezoelectric element 40 has electrode forming top and bottom faces 50 and 51, rear and front end faces 52 and 53, and left and right side faces 54 and 55.

The piezoelectric element 40 is embedded in the opening 20 of the base plate 11a. When the piezoelectric element 40 is set at a predetermined position in the opening 20, the top electrode 70 is flush with or lower than a surface 11d of the base plate 11a, to provide an appearance that the piezoelectric element 40 is embedded in the opening 20.

With the piezoelectric element 40 being positioned in the opening 20, the rear and front faces 52 and 53 of the piezoelectric element 40 face side faces 60 and 61 of the opening 20 with a predetermined clearance between them, respectively. The side faces 54 and 55 of the piezoelectric element 40 face side walls 62 and 63 of each of the base and front parts 11a1 and 11a2 of the base plate 11a with a predetermined clearance between them, respectively.

The electrode forming face 50 of the piezoelectric element 40 is covered with the top electrode 70 and the electrode forming face 51 thereof is covered with the bottom electrode 71. The electrodes 70 and 71 are made by vapor deposition, spattering, plating, or the like of conductive material such as gold (Au).

A base end 40a of the piezoelectric element 40 faces the base part 19a1 of the receiver 19a and a front end 40b of the piezoelectric element 40 faces the front part 19a2 of the receiver 19a in a thickness direction.

The base part 19a1 and front part 19a2 of the receiver 19a protrude from the side faces 60 and 61 of the opening 20, to receive the bottom electrode 71 of the piezoelectric element 40.

The base end 40a of the piezoelectric element 40 is fixed to the base part 19a1 of the receiver 19a with a nonconductive adhesive 80. The front end 40b of the piezoelectric element 40 is fixed to the front part 19a2 of the receiver 19a with the nonconductive adhesive 80.

The nonconductive adhesive 80 may be any known nonconductive adhesive or any known conductive adhesive mixed with insulating particles such as silica particles and glass particles.

The nonconductive adhesive 80 forms a layer between the bottom electrode 71 of the piezoelectric element 40 and the base part 19a1 and front part 19a2 of the receiver 19a.

The nonconductive adhesive layer 80 preferably has a thickness of about 10 µm or over. This thickness secures electrical insulation between the bottom electrode 71 of the piezoelectric element 40 and the base part 19a1 and front part 19a2 of the receiver 19a.

The clearances between the end faces 52, 53, 54, and 55 of the piezoelectric element 40 and the side faces 60, 61, 62, and 63 of the opening 20 are filled with the nonconductive adhesive 80 that forms a layer having a proper thickness.

To receive the nonconductive adhesive 80 filled between the end faces 54 and 55 of the piezoelectric element 40 and the left and right side faces 62 and 63 of the opening 20, adhesive receivers 23 and 24 are formed on the receiver 19a at positions corresponding to the end faces 54 and 55. The adhesive receivers 23 and 24 protrude along the end faces 54 and 55 of the piezoelectric element 40 and form a slight gap between tip ends thereof facing each other.

The nonconductive adhesive layer 80 between the end faces 52, 53, 54, and 55 of the piezoelectric element 40 and the side faces 60, 61, 62, and 63 of the opening 20 enables a distortion (displacement) of the piezoelectric element 40 to surely be transferred to the load beam 13a and secures electrical insulation between the top and bottom electrodes 70 and 71 of the piezoelectric element 40 and the side faces 60, 61, 62, and 63 of the opening 20.

A wiring connection structure for the piezoelectric actuator 12 of the head suspension 10 according to the first embodiment will be explained.

When setting the piezoelectric element 40 in the opening 20, the side faces 60, 61, 62, and 63 of the opening 20 restrict the piezoelectric element 40 so that the piezoelectric element 40 is correctly positioned in the opening 20.

The top electrode 70 of the piezoelectric element 40 is grounded to the base plate 11a with a conductive adhesive such as silver paste 72 as illustrated in FIG. 2.

The bottom electrode 71, which corresponds to an element electrode formed on the piezoelectric element 40, faces the flexure (wiring member) 15 with a slight gap of about several tens of micrometers between them.

To fill the gap between the bottom electrode 71 and the flexure 15 and secure electrical connection between them, the flexure 15 has a through hole 73 formed through the conductive base layer 15a and insulating layer 15b. The through hole 73 is substantially circular. Through the through hole 73, the wiring layer 15c of the flexure 15 faces the bottom electrode 71 of the piezoelectric element 40. At the part facing the bottom electrode 71, the wiring layer 15c is provided with a wiring electrode 75. The through hole 73 is configured to expose the wiring electrode 75 to the bottom electrode (element electrode) 71.

The wiring electrode 75 is made of conductive metal material such as copper and nickel. The wiring electrode 75 has a projection 77-1 that projects toward the bottom electrode 71. The bottom electrode 71 is the other electrode to which the projection 77-1 of the wiring electrode 75 as the one electrode faces through the through hole 73. The projection 77-1 has a dome shape having a top 77-1a that is in contact with the bottom electrode 71 and is surrounded with a conductive adhesive 79 as illustrated in FIGS. 2 to 3B.

In this way, the wiring connection structure for the piezoelectric actuator 12 brings the bottom electrode 71 and wiring electrode 75 into contact with each other through the projection 77-1 and joins them in the contact state together with the conductive adhesive 79, thereby electrically connecting the electrodes 71 and 75 to each other.

When a voltage is applied to the piezoelectric actuator 12, both sides of the piezoelectric element 40 in a left-right direction deforms so that one side of the piezoelectric element 40 shrinks in a front-rear direction and the opposite side thereof expands in the front-rear direction. Thus, the piezoelectric element 40 as a whole deforms into a trapezoid.

According to the deformation of the piezoelectric element 40 and a stroke thereof, the front end of the load beam 13a moves relative to the base plate 11a in the sway direction X in FIG. 1B.

Effects of the first embodiment will be explained.

The head suspension 10 according to the first embodiment employs the wiring electrode 75 that is provided with the projection 77-1. The projection 77-1 faces the bottom electrode 71 of the piezoelectric element 40 and allows the bottom electrode 71 and wiring electrode 75 to be in contact with each other. The connected electrodes 71 and 75 are bonded or joined together with the conductive adhesive 79. With the contact and bond, it secures conductivity between the electrodes 71 and 75 and achieves the wiring connection to the piezoelectric element 40 without applying local stress onto the piezoelectric element 40.

Namely, the first embodiment is capable of carrying out the wiring connection to the piezoelectric element 40 of the head suspension 10 with high reliability without damaging the piezoelectric element 40.

The conductive adhesive 79 shrinks when cured, to enhance the bonding strength of the electrodes 71 and 75.

The links 19a3 of the receiver 19a each have a U-shape to connect the base and front parts 19a1 and 19a2 of the receiver 19a to each other. Accordingly, the receiver 19a does not interfere with the piezoelectric element 40 when installing the piezoelectric element 40 in the opening 20 of the base plate 11a. As a result, no dust or short circuit occurs during the installation.

The links 11a3 of the base plate 11a and the links 19a3 of the receiver 19a are arranged not to overlap each other. Accordingly, when the piezoelectric actuator 12 conducts a sway operation, the links 11a3 and 19a3 do not interfere with each other, and therefore, never cause dust or noise.

The receiver 19a may be made from a metal thin material such as a stainless steel thin material by chemical etching. In this case, the links 19a3 of the receiver 19a can precisely be made as designed. This results in precisely setting a sway-direction spring constant of the receiver 19a.

The base part 19a1, front part 19a2, and adhesive receivers 23 and 24 of the receiver 19a receive the nonconductive adhesive 80, so that the nonconductive adhesive 80 surrounds a circumferential end face of the piezoelectric element 40.

This configuration secures electrical insulation between the electrodes 70 and 71 of the piezoelectric element 40 and the opening 20 and prevents the circumferential end face of the piezoelectric element 40 from producing dust.

The adhesive receivers 23 and 24 and base and front parts 19a1 and 19a2 of the receiver 19a, the bottom electrode 71 and circumferential end face of the piezoelectric element 40, and the side walls of the opening 20 define a space in which the nonconductive adhesive layer 80 is formed. Surrounded with the nonconductive adhesive layer 80, the piezoelectric element 40 is set inside the opening 20 through the nonconductive adhesive layer 80. With this structure, a distortion (displacement) of the piezoelectric element 40 is surely transferred to the load beam 13a, and at the same time, electrical insulation is secured between the electrodes 70 and 71 of the piezoelectric element 40 and the side faces 60, 61, 62, and 63 of the opening 20. In addition, the nonconductive adhesive layer 80 surrounding the piezoelectric element 40 effectively protects the piezoelectric element 40 that is brittle.

On each side of the piezoelectric element 40, the adhesive receivers 23 and 24 are spaced from each other, to allow the base part 19a1 and front part 19a2 of the receiver 19a to freely move relative to each other in the left and right directions. As a result, the links 19a3 of the receiver can surely have flexibility between the base and front parts 19a1 and 19a2 of the receiver 19a in the left and right directions.

Accordingly, the head suspension 10 according to the first embodiment smoothly and accurately achieves a minute movement in the sway direction X (FIG. 1B) based on a distortion (displacement) of the piezoelectric actuator 12.

Figure 4A:
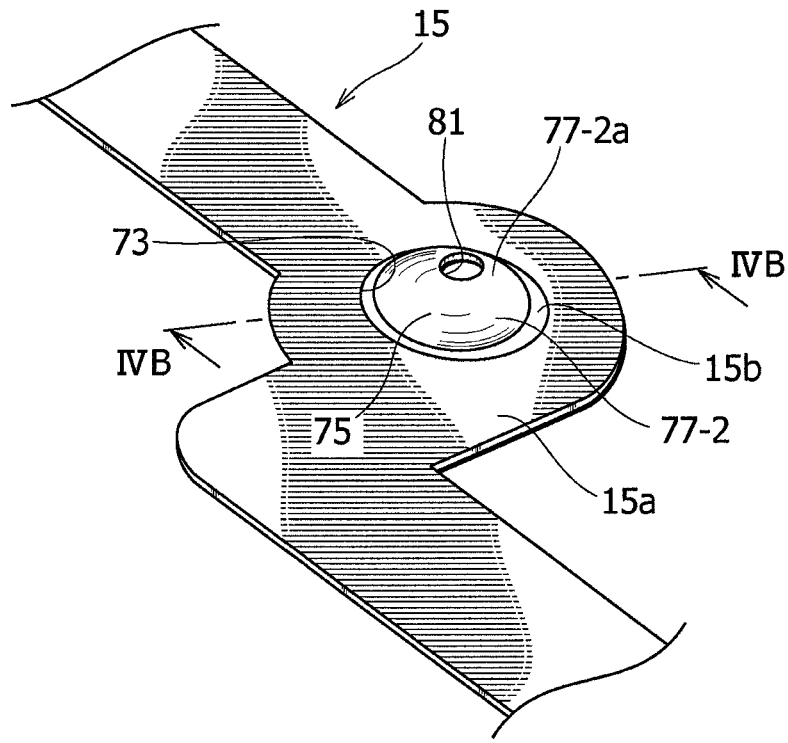
Figure 4B:
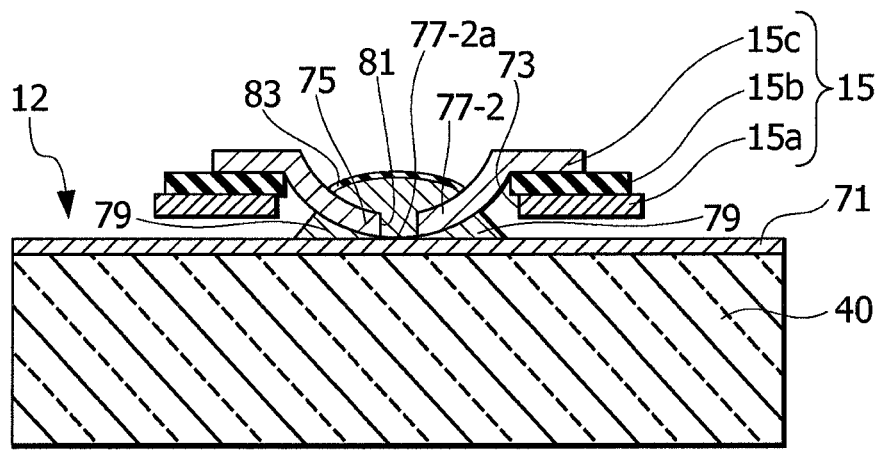

A head suspension according to a second embodiment of the present invention will be explained with reference to FIGS. 4A and 4B in which FIG. 4A is a perspective view illustrating a wiring flexure of a head suspension of the second embodiment and FIG. 4B is a sectional view taken along a line IVB-IVB of FIG. 4A with a piezoelectric element.

The head suspension of the second embodiment is basically the same as that of the first embodiment except for the wiring connection structure for the piezoelectric actuator 12. Accordingly, the characteristic part of the second embodiment will be explained with reference to FIGS. 4A and 4B and in comparison with the first embodiment.

Any part of the second embodiment that is a variation of the corresponding part of the first embodiment is represented with a common number plus a specific number. For example, a projection 77-2 of the second embodiment corresponds to the projection 77-1 of the first embodiment and a top 77-2a of the projection 77-2 of the second embodiment corresponds to the top 77-1a of the projection 77-1 of the first embodiment. Namely, the specific number such as "2" that follows a hyphen after the common number such as "77" indicates an embodiment number. This numbering system is applied to every embodiment explained below.

Through the embodiments, the parts having the same common number basically provide the same function, and therefore, explanations of such parts will not be repeated.

According to the first embodiment, there is no hole at the top 77-1a of the projection 77-1 as illustrated in FIGS. 3A and 3B.

On the other hand, the second embodiment illustrated in FIGS. 4A and 4B forms a hole 81 at a top 77-2a of the projection 77-2 on the wiring electrode 75 of the flexure (wiring member) 15. The hole 81 faces the bottom electrode (element electrode) 71 of the piezoelectric element 40.

The second embodiment sets the piezoelectric element 40 on the flexure (wiring member) 15 and applies the conductive adhesive 79 to bury the hole 81. Unlike this, the first embodiment applies the conductive adhesive 79, and thereafter, sets the piezoelectric element 40 on the flexure 15.

According to the second embodiment, the conductive adhesive 79 is covered with a corrosion preventive film 83 made of, for example, polyimide resin. The film 83 prevents oxidation of the conductive adhesive 79.

According to the second embodiment, the bottom electrode 71 of the piezoelectric element 40 is the other electrode to which the projection 77-2 of the wiring electrode 75 as the one electrode faces through the through hole 73.

The second embodiment brings the element and wiring electrodes 71 and 75 into contact with each other through the projection 77-2 formed on the wiring electrode 75 and applies the conductive adhesive 79 to bond the electrodes 71 and 75 together.

Effects of the second embodiment additional to those of the first embodiment will be explained.

The second embodiment positions the piezoelectric element 40 on the flexure 15 and applies the conductive adhesive 79 to fill the hole 81 from the back side of the projection 77-2. Accordingly, the hole 81 allows the conductive adhesive 79 to be applied from the back side of the projection 77-2, to simplify the manufacturing of the head suspension.

The hole 81 may be formed at a part of the wiring electrode 75 where the top 77-2a is to be formed in advance, and then, the wiring electrode 75 may be punched to form the projection 77-2. In this case, the hole 81 allows the material of the wiring electrode 75 to expand, thereby simply and correctly shaping the projection 77-2.

The second embodiment covers the conductive adhesive 79 with the corrosion preventive film 83, to prevent oxidation of the conductive adhesive 79.

Figure 5A:
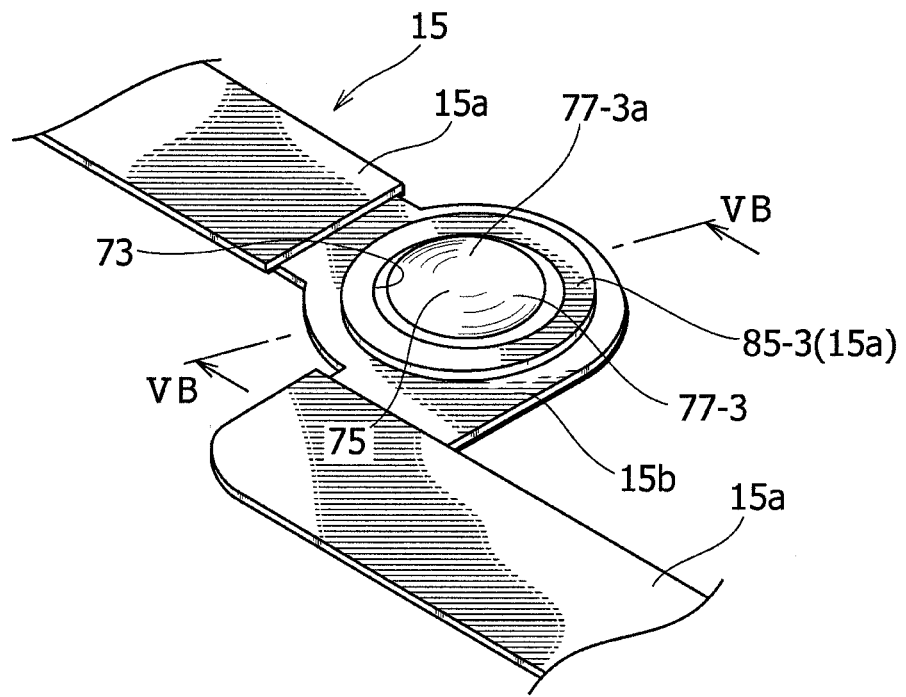
Figure 5B:
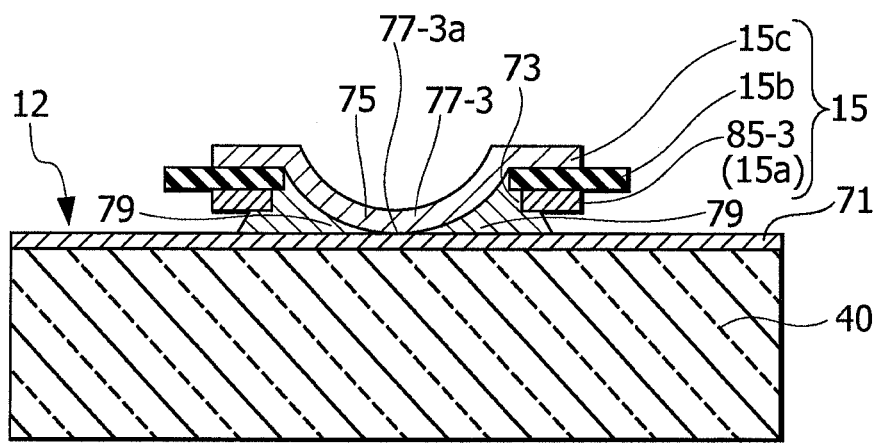

A head suspension according to the third embodiment of the present invention will be explained with reference to FIGS. 5A and 5B in which FIG. 5A is a perspective view illustrating a flexure of a head suspension of the third embodiment and FIG. 5B is a sectional view taken along a line VB-VB with a piezoelectric element.

The head suspension of the third embodiment is basically the same as that of the first embodiment except for the wiring connection structure for the piezoelectric actuator 12. Accordingly, the characteristic part of the third embodiment will be explained with reference to FIGS. 5A and 5B and in comparison with the first embodiment.

According to the first embodiment illustrated in FIGS. 3A and 3B, there is no liquid stopper and the conductive base layer 15a continuously extends along the flexure 15 except the part where the through hole 73 is formed.

On the other hand, the third embodiment illustrated in FIGS. 5A and 5B forms a liquid stopper 85-3 around the through hole 73 of the flexure (wiring member) 15. The liquid stopper 85-3 is formed by isolating the conductive base layer 15a of the flexure 15 into a ring around the through hole 73.

The third embodiment removes the conductive base layer 15a of the flexure 15 around the through hole 73 by etching except the part serving as the liquid stopper 85-3. Namely, the third embodiment forms the liquid stopper 85-3 by leaving the conductive base layer 15a around the through hole 73 when etching the conductive base layer 15a. The part of the flexure 15 where the conductive base layer 15a is removed exposes the insulating layer 15b. The liquid stopper 85-3 faces the bottom electrode 71 of the piezoelectric element 40 to prevent the conductive adhesive 79, which is liquid when applied, from diffusing.

According to the third embodiment, the bottom electrode 71 of the piezoelectric element 40 is the other electrode to which the projection 77-3 of the wiring electrode 75 as the one electrode faces through the through hole 73.

The third embodiment brings the element and wiring electrodes 71 and 75 into contact with each other through a projection 77-3 formed on the wiring electrode 75 and joins the electrodes 71 and 75 together with the conductive adhesive 79.

Effects of the third embodiment additional to those of the first embodiment will be explained.

The conductive adhesive 79 is liquid when applied. The third embodiment forms the liquid stopper 85-3 on the flexure (wiring member) 15 around the through hole 73, to face the bottom electrode (element electrode) 71 of the piezoelectric element 40. The liquid stopper 85-3 prevents the liquid conductive adhesive 79 from freely diffusing around the through hole 73.

The liquid stopper 85-3 prevents the liquid conductive adhesive 79 from spreading due to a capillary phenomenon and from hardening at locations where no bonding is needed.

The liquid stopper 85-3 prevents the rigidity imbalance and dynamic characteristic deterioration of the head suspension due to such unnecessary bonding.

The liquid stopper 85-3 is formed by isolating the conductive base layer 15a around the through hole 73 into a ring. Namely, there is no need of separately preparing a material for making the liquid stopper 85-3. The head suspension according to the third embodiment, therefore, is simply manufacturable without increasing the number of parts.

Since the liquid stopper 85-3 prevents the liquid conductive adhesive 79 from freely diffusing, the quantity of the conductive adhesive 79 to be applied is easy to adjust.

Figure 6A:
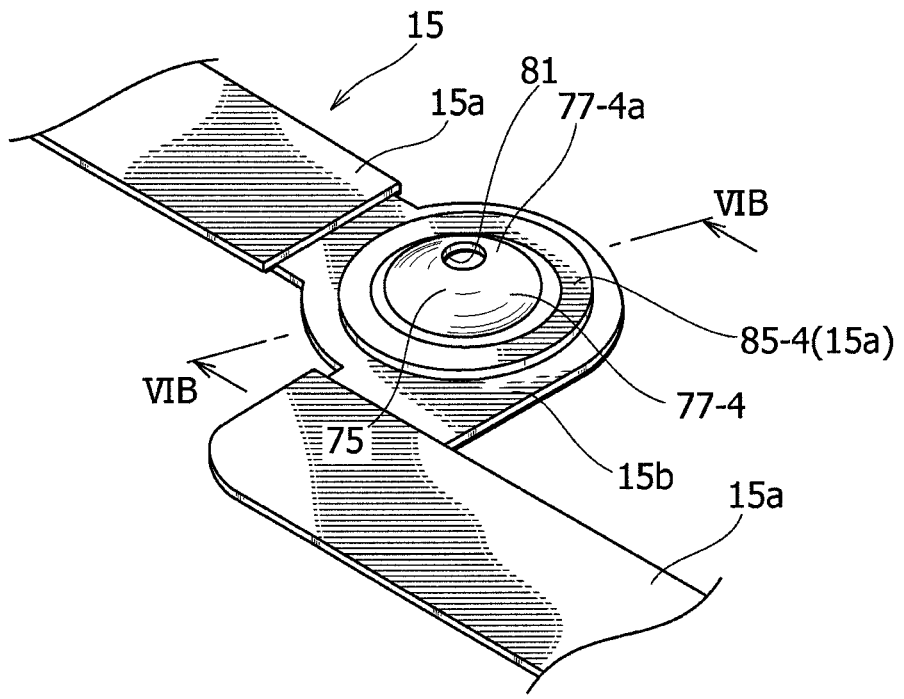
Figure 6B:
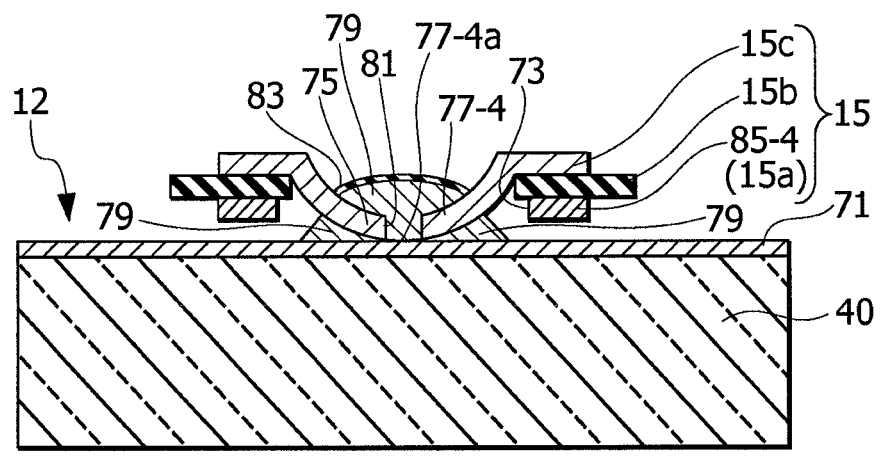

A head suspension according to the fourth embodiment of the present invention will be explained with reference to FIGS. 6A and 6B in which FIG. 6A is a perspective view illustrating a flexure of a head suspension of the fourth embodiment and FIG. 6B is a sectional view taken along a line VIB-VIB of FIG. 6A with a piezoelectric element.

The head suspension of the fourth embodiment is basically the same as that of the second embodiment illustrated in FIGS. 4A and 4B except for the wiring connection structure for the piezoelectric actuator 12. Accordingly, the characteristic part of the fourth embodiment will be explained with reference to FIGS. 6A and 6B and in comparison with the second embodiment.

According to the second embodiment illustrated in FIGS. 4A and 4B, there is no liquid stopper and the conductive base layer 15a continuously extends along the flexure 15 except the part where the through hole 73 is formed.

On the other hand, the fourth embodiment illustrated in FIGS. 6A and 6B forms a liquid stopper 85-4 around the through hole 73 of the flexure (wiring member) 15. The liquid stopper 85-4 is formed by isolating the conductive base layer 15*a* of the flexure 15 into a ring around the through hole 73.

The liquid stopper 85-4 of the fourth embodiment functions like the liquid stopper 85-3 of the third embodiment, and therefore, explanation thereof is omitted.

According to the fourth embodiment, the bottom electrode 71 of the piezoelectric element 40 is the other electrode to which the projection 77-4 of the wiring electrode 75 as the one electrode faces through the through hole 73.

The fourth embodiment brings the element and wiring electrodes 71 and 75 into contact with each other through a projection 77-4 formed on the wiring electrode 75 and joins the electrodes 71 and 75 together with the conductive adhesive 79.

Effects of the fourth embodiment are similar to those of the third embodiment.

According to the fourth embodiment, the liquid stopper 85-4 prevents the liquid conductive adhesive 79 from spreading due to a capillary phenomenon and from hardening at locations where no bonding is needed. The liquid stopper 85-4 prevents the rigidity imbalance and dynamic characteristic deterioration of the head suspension due to such unnecessary bonding.

The head suspension according to the fourth embodiment is simply manufacturable without increasing the number of parts.

Since the liquid stopper 85-4 prevents the liquid conductive adhesive 79 from freely diffusing, the quantity of the conductive adhesive 79 to be applied is easy to adjust.

A head suspension according to the fifth embodiment of the present invention will be explained with reference to FIG. 7A that is a sectional view illustrating a flexure with a piezoelectric element of a head suspension of the fifth embodiment.

The head suspension of the fifth embodiment is basically the same as that of the third embodiment illustrated in FIGS. 5A and 5B except for the wiring connection structure for the piezoelectric actuator 12. Accordingly, the characteristic part of the fifth embodiment will be explained with reference to FIG. 7A and in comparison with the third embodiment.

According to the third embodiment illustrated in FIGS. 5A and 5B, an inner circumferential edge of the liquid stopper 85-3 is outside an outer circumferential edge of the projection 77-3 in plan view.

Figure 7A:
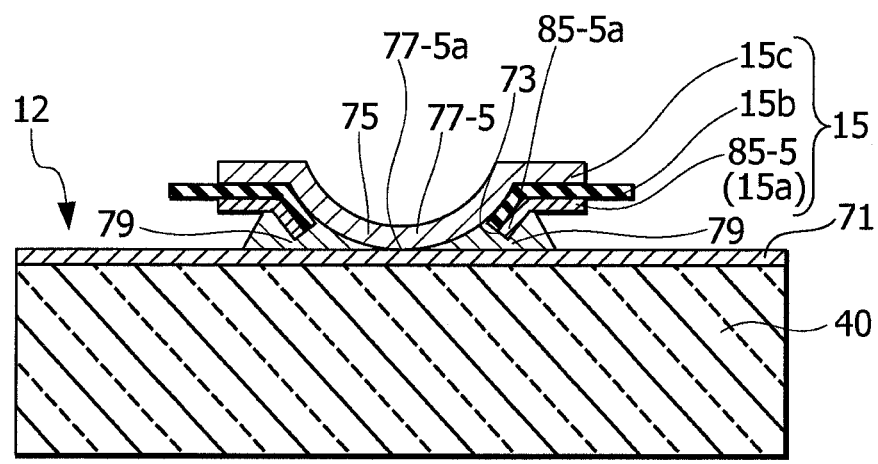
FIG. 7A is a sectional view illustrating a wiring member with a piezoelectric element of a head suspension according to a fifth embodiment of the present invention.

On the other hand, the fifth embodiment illustrated in FIG. 7A employs a liquid stopper 85-5 whose inner circumferential edge 85-5*a* is inside an outer circumferential edge of a projection 77-5 formed on the wiring electrode 75 in plan view. Namely, the inner circumferential edge 85-5*a* of the liquid stopper 85-5 extends along the dome-shaped projection 77-5.

The fifth embodiment forms the inner circumferential edge 85-5*a* of the liquid stopper 85-5 and an inner circumferential edge of the insulating layer 15*b* of the flexure (wiring member) 15 to project and extend along the dome-shaped projection 77-5 when punching the wiring electrode 75 into the dome-shaped projection 77-5. It is possible to extend only one of the inner circumferential edge 85-5*a* of the liquid stopper 85-5 and the inner circumferential edge of the insulating layer 15*b* along the dome-shaped projection 77-5.

According to the fifth embodiment, the bottom electrode 71 of the piezoelectric element 40 is the other electrode to which the projection 77-5 of the wiring electrode 75 as the one electrode faces through the through hole 73.

The fifth embodiment brings the element and wiring electrodes 71 and 75 into contact with each other through the projection 77-5 formed on the wiring electrode 75 and joins the electrodes 71 and 75 together with the conductive adhesive 79.

Effects of the fifth embodiment additional to those of the first and third embodiments will be explained.

If the wiring electrode 75 is a thin plate made by plating copper, the dome shape of the projection 77-3 of the third embodiment will be unstable because the wiring electrode 75 is thin.

In contrast, the fifth embodiment projects the inner circumferential edge 85-5*a* of the liquid stopper 85-5 and the inner circumferential edge of the insulating layer 15*b* to extend along the dome-shaped projection 77-5 of the wiring electrode 75, to stably support the dome-shaped projection 77-5 from the outer circumferential side thereof. This is possible because the liquid stopper 85-5, i.e., the conductive base layer 15*a* is made of strong material such as a stainless steel thin plate and the insulating layer 15*b* is made of, for example, polyimide resin.

If the wiring electrode 75 is made of copper of high purity, the projection 77-5 is more or less soft. In this case, the height of the projection 77-5 may have an allowance to absorb a variation in a gap between the projection 77-5 and the bottom electrode 71 of the piezoelectric element 40 to which the projection 77-5 is attached.

A head suspension according to the sixth embodiment of the present invention will be explained with reference to FIG. 7B that is a sectional view illustrating a flexure with a piezoelectric element of a head suspension of the sixth embodiment.

The head suspension of the sixth embodiment is basically the same as that of the fourth embodiment illustrated in FIGS. 6A and 6B except for the wiring connection structure for the piezoelectric actuator 12. Accordingly, the characteristic part of the sixth embodiment will be explained with reference to FIG. 7B and in comparison with the fourth embodiment.

According to the fourth embodiment illustrated in FIGS. 6A and 6B, an inner circumferential edge of the liquid stopper 85-4 is outside an outer circumferential edge of the projection 77-4 in plan view.

Figure 7B:
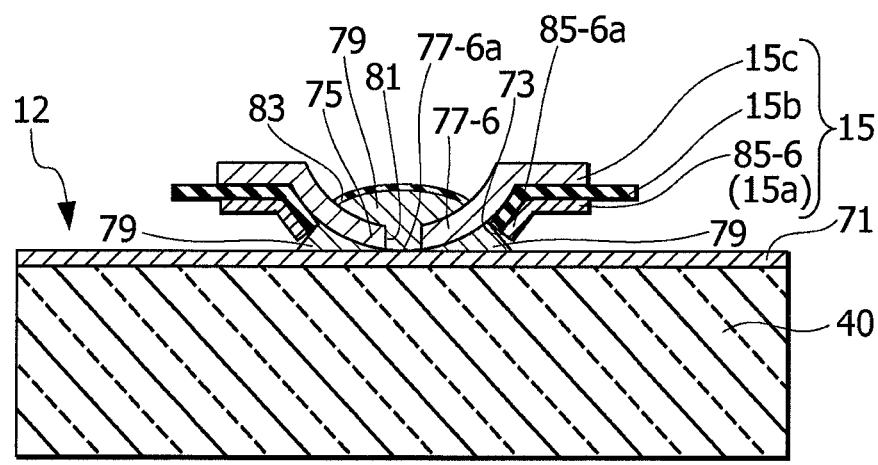
FIG. 7B is a sectional view illustrating a wiring member with a piezoelectric element of a head suspension according to a sixth embodiment of the present invention.

On the other hand, the sixth embodiment illustrated in FIG. 7B employs a liquid stopper 85-6 whose inner circumferential edge 85-6*a* is inside an outer circumferential edge of a projection 77-6 formed on the wiring electrode 75 in plan view. Namely, the inner circumferential edge 85-6*a* of the liquid stopper 85-6 projects and extends along the dome-shaped projection 77-5.

The sixth embodiment projects the inner circumferential edge 85-6*a* of the liquid stopper 85-6 and an inner circumferential edge of the insulating layer 15*b* of the flexure (wiring member) 15 to extend along the dome-shaped projection 77-6 when punching the wiring electrode 75 into the dome-shaped projection 77-6. It is possible to extend only one of the inner circumferential edge 85-6*a* of the liquid stopper 85-6 and the inner circumferential edge of the insulating layer 15*b* along the dome-shaped projection 77-6.

According to the sixth embodiment, the bottom electrode 71 of the piezoelectric element 40 is the other electrode to which the projection 77-6 of the wiring electrode 75 as the one electrode faces through the through hole 73.

The sixth embodiment brings the element and wiring electrodes 71 and 75 into contact with each other through the projection 77-6 formed on the wiring electrode 75 and joins the electrodes 71 and 75 together with the conductive adhesive 79.

Effects of the sixth embodiment are similar to those of the fifth embodiment.

The sixth embodiment projects the inner circumferential edge 85-6*a* of the liquid stopper 85-6 and the inner circumferential edge of the insulating layer 15*b* to extend along the dome-shaped projection 77-6 of the wiring electrode 75, to stably support the dome-shaped projection 77-6 from the outer circumferential side thereof. This is possible because the liquid stopper 85-6, i.e., the conductive base layer 15*a* is made of strong material such as a stainless steel thin plate and the insulating layer 15*b* is made of for example, polyimide resin.

If the wiring electrode 75 is made of copper of high purity, the projection 77-6 is more or less soft. In this case, the height of the projection 77-6 may have an allowance to absorb a variation in a gap between the projection 77-6 and the bottom electrode 71 of the piezoelectric element 40 to which the projection 77-6 is attached.

A head suspension according to the seventh embodiment of the present invention will be explained with reference to FIG. 8A that is a sectional view illustrating a flexure with a piezoelectric element of a head suspension of the seventh embodiment.

The head suspension of the seventh embodiment is basically the same as that of the fifth embodiment illustrated in FIG. 7A except for the wiring connection structure for the piezoelectric actuator 12. Accordingly, the characteristic part of the seventh embodiment will be explained with reference to FIG. 8A and in comparison with the fifth embodiment.

According to the fifth embodiment illustrated in FIG. 7A, the projection 77-5 has no contact plane at the top 77-5*a* and has the dome shape that is in contact with the bottom electrode 71 of the piezoelectric element 40.

Figure 8A:
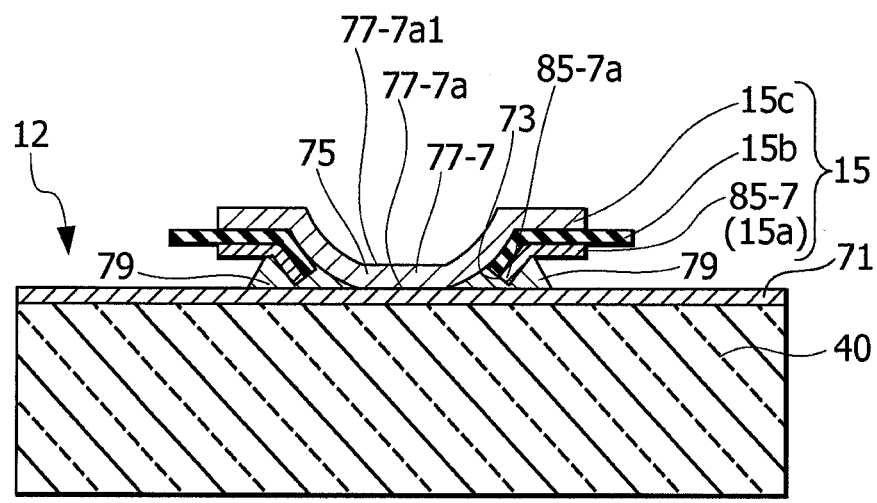
FIG. 8A is a sectional view illustrating a wiring member with a piezoelectric element of a head suspension according to a seventh embodiment of the present invention.

On the other hand, the seventh embodiment illustrated in FIG. 8A forms a contact plane 77-7*a*1 at a top 77-7*a* of a projection 77-7. The contact plane 77-7*a*1 is in contact with the bottom electrode 71 of the piezoelectric element 40.

According to the seventh embodiment, the contact plane 77-7*a*1 is substantially a circular area to increase a contact area between the bottom electrode 71 and the wiring electrode 75.

According to the seventh embodiment, the bottom electrode 71 of the piezoelectric element 40 is the other electrode to which the projection 77-7 of the wiring electrode 75 as the one electrode faces through the through hole 73.

The seventh embodiment brings the element and wiring electrodes 71 and 75 into contact with each other through the projection 77-7 formed on the wiring electrode 75 and joins the electrodes 71 and 75 together with the conductive adhesive 79.

Effects of the seventh embodiment additional to those of the fifth embodiment will be explained According to the seventh embodiment, the projection 77-7 has the contact plane 77-7*a*1 at the top 77-7*a* of the projection 77-7. The contact plane 77-7*a*1 is in contact with the bottom electrode 71 of the piezoelectric element 40, to increase a contact area between the bottom electrode 71 and the wiring electrode 75 and reduce a contact resistance between them.

Consequently, the seventh embodiment secures electrical conduction between the bottom electrode 71 and the wiring electrode 75 and improves the reliability of wiring connection to the piezoelectric element 40.

A head suspension according to the eighth embodiment of the present invention will be explained with reference to FIG. 8B that is a sectional view illustrating a flexure with a piezoelectric element of a head suspension of the eighth embodiment.

The head suspension of the eighth embodiment is basically the same as that of the seventh embodiment illustrated in FIG. 8A except for the wiring connection structure for the piezoelectric actuator 12. Accordingly, the characteristic part of the eighth embodiment will be explained with reference to FIG. 8B and in comparison with the seventh embodiment.

According to the seventh embodiment illustrated in FIG. 8A, the top 77-7*a* of the projection 77-7 has no hole.

Figure 8B:
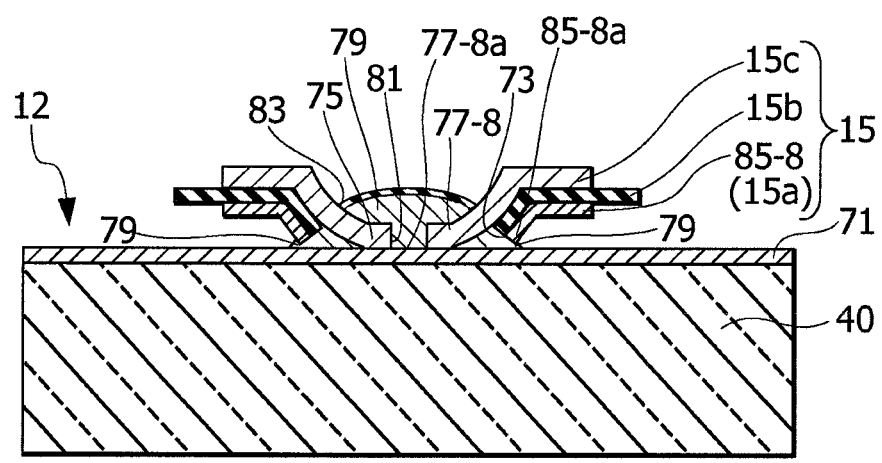
FIG. 8B is a sectional view illustrating a wiring member with a piezoelectric element of a head suspension according to an eighth embodiment of the present invention.

On the other hand, the eighth embodiment illustrated in FIG. 8B forms a hole 81 at a top 77-8*a* of a projection 77-8 of the wiring electrode 75. The hole 81 faces the bottom electrode (element electrode) 71 of the piezoelectric element 40.

According to the eighth embodiment, the bottom electrode 71 of the piezoelectric element 40 is the other electrode to which the projection 77-8 of the wiring electrode 75 as the one electrode faces through the through hole 73.

The eighth embodiment brings the element and wiring electrodes 71 and 75 into contact with each other with the projection 77-8 formed on the wiring electrode 75 and joins the electrodes 71 and 75 together with the conductive adhesive 79.

Effects of the eighth embodiment are similar to those of the sixth and seventh embodiments.

According to the eighth embodiment, the head suspension is simply manufacturable while securing electrical conduction between the bottom electrode 71 and the wiring electrode 75 and improving the reliability of wiring connection to the piezoelectric element 40.

A first method of manufacturing a head suspension according to an embodiment of the present invention will be explained in connection with manufacturing the head suspension of the seventh embodiment illustrated in FIG. 8A. This manufacturing method is also applicable to manufacturing the head suspensions of the third and fifth embodiments.

Figure 11:
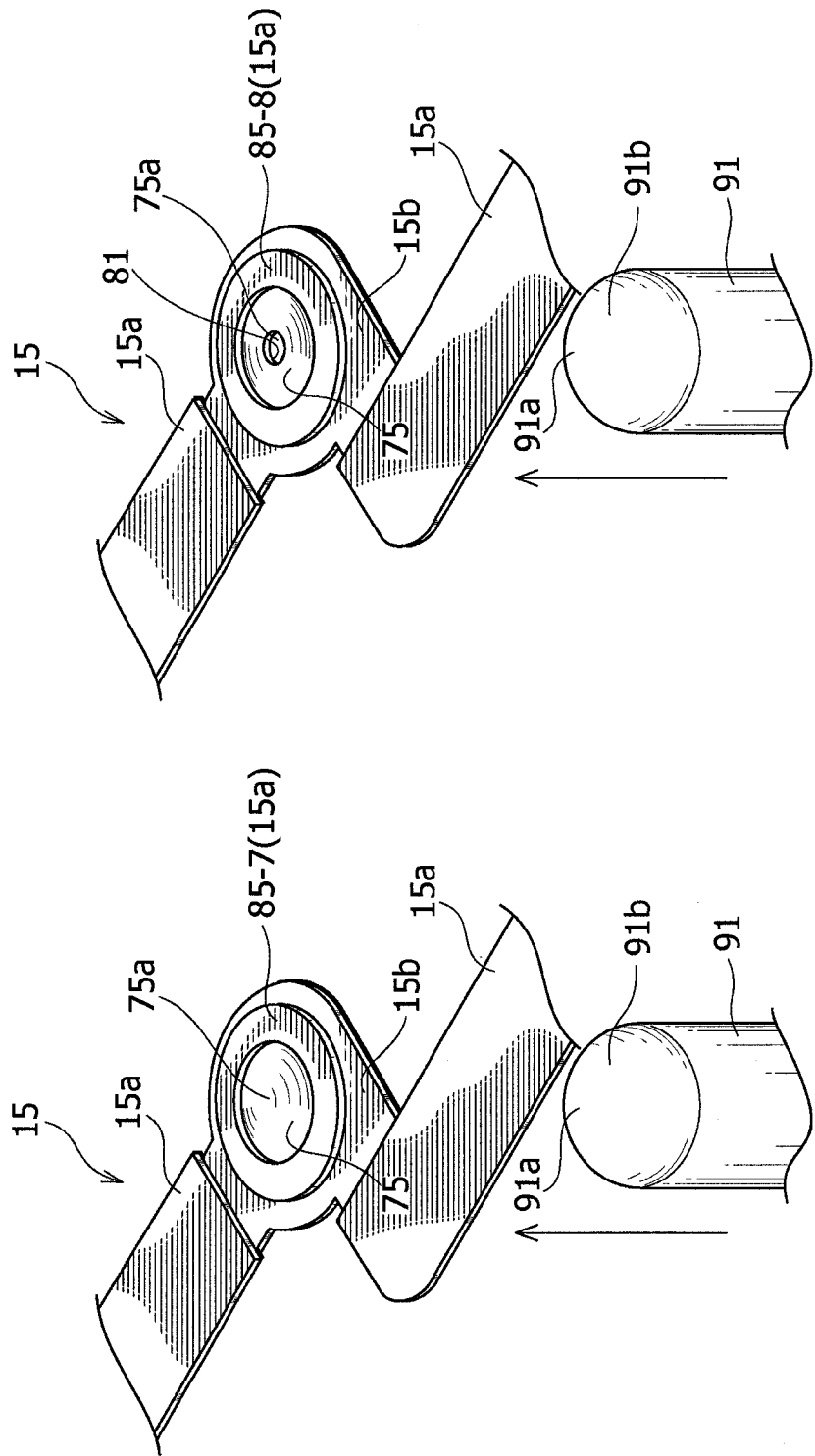
FIGS. 11A and 11B are perspective views each illustrating a punching operation to form a dome-shaped projection on a wiring electrode according to one of the embodiments of the present invention.
Figure 12:
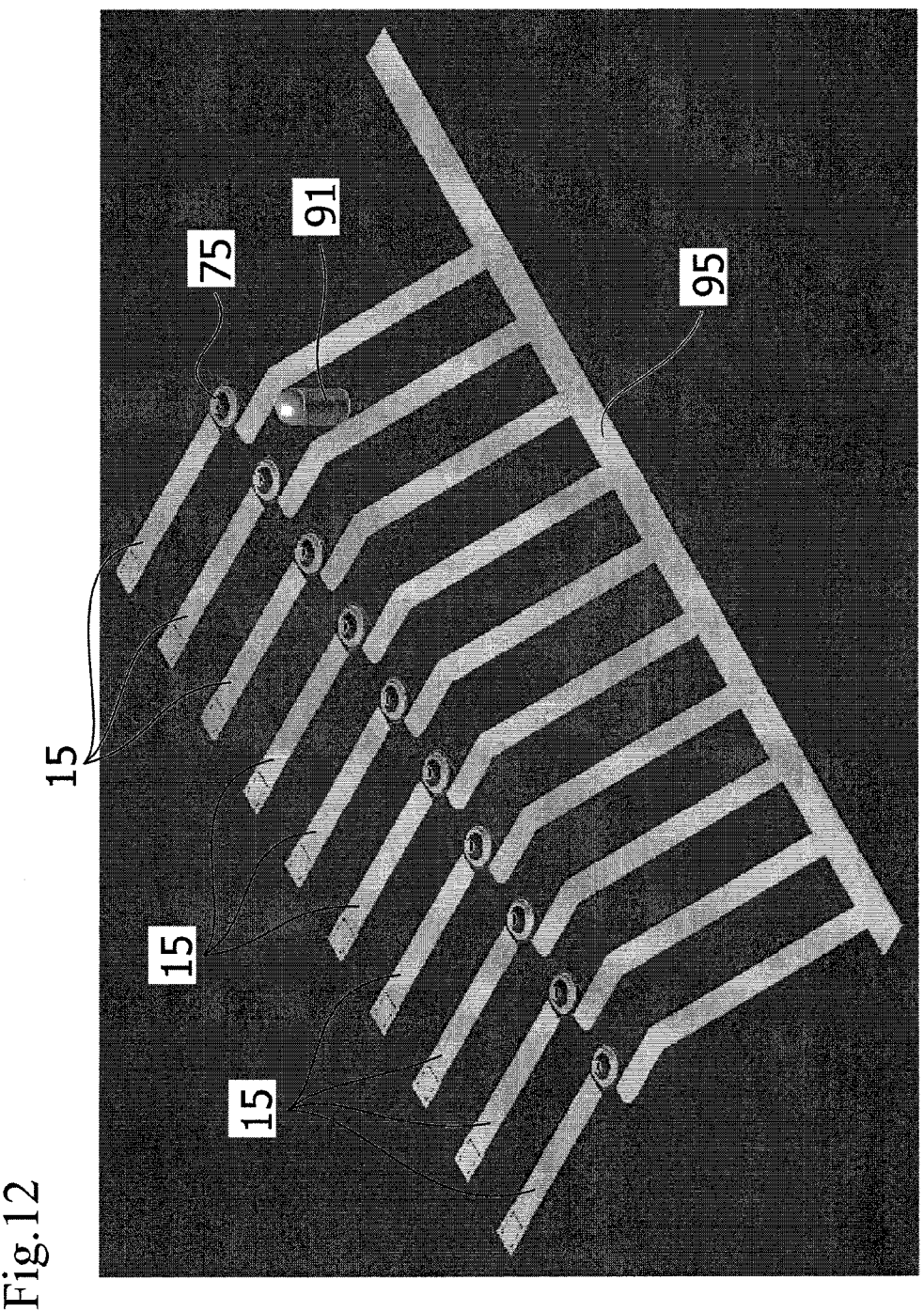
FIG. 12 is a schematic view illustrating a punching operation carried out on wiring members chained in a frame.

FIG. 9 is a flowchart illustrating steps of manufacturing the head suspension of the seventh embodiment with sectional views corresponding the steps, FIG. 11A illustrates a step of punching the wiring electrode 75 into the projection 77-7, and FIG. 12 illustrates the step of punching process carried out on wiring members chained in a frame.

As illustrated in FIG. 9, the first head suspension manufacturing method includes a through hole forming step S101, a projection forming step S102, a conductive adhesive applying step S103, a piezoelectric element (PZT) setting step S104, and an adhesive curing step 105.

The through hole forming step S101 forms the through hole 73 through the conductive base layer 15*a* and insulating layer 15*b* of the wiring member (flexure) 15.

At this time, the through hole 73 of the conductive base layer 15*a* may be made by, for example, etching. The through hole 73 of the insulating layer 15*b* may be made by applying a mask which has a pattern corresponding to the through hole 73 to the flexure 15 when forming the insulating layer 15*b*. The through hole 73 exposes the wiring electrode 75 to the bottom electrode (element electrode) 71 of the piezoelectric element 40.

As illustrated in FIGS. 11A and 9, the projection forming step S102 applies a punch 91 having a dome-shaped tip 91*b* to the back of the wiring electrode 75, to form the dome-shaped projection 77-7 on the wiring electrode 75.

At this time, an apex 91*a* of the punch 91 is positioned to a central point 75*a* of the wiring electrode 75 and the punch 91 is pressed to the back of the wiring electrode 75. To receive the punch 91, a die may be used.

The projection forming step S102 may be carried out on plural flexures (wiring members) 15 chained in a frame 95 as illustrated in FIG. 12, or on a discrete flexure (wiring member) 15.

Simultaneously with the punching of the projection 77-7, the projection forming step S102 bends the inner circumferential edge 85-7a of the liquid stopper 85-7 and the inner circumferential edge of the insulating layer 15b along the dome-shaped projection 77-7.

The conductive adhesive applying step S103 applies the conductive adhesive 79 around the top 77-7a of the projection 77-7 as illustrated in FIG. 9. Instead of or in addition to the top 77-7a of the projection 77-7, the conductive adhesive 79 may be applied to a part of the bottom electrode 71 of the piezoelectric element 40 where the top 77-7a of the projection 77-7 is positioned.

The piezoelectric element setting step S104 sets the piezoelectric element 40 on the flexure (wiring member) 15. In connection with this, the height of the projection 77-7 may be set to be larger than a gap with respect to the bottom electrode 71 of the piezoelectric element 40.

If the wiring electrode 75 is made of copper of high purity, the projection 77-7 is more or less soft. In this case, the height of the projection 77-7 is set to exceed the gap, so that the top 77-7a of the projection 77-7 may collapse and form the circular and flat contact plane 77-7a1 when the projection 77-7 is pressed to the bottom electrode 71 of the piezoelectric element 40.

The wiring electrode 75 is made of a material having a relatively low hardness, such as copper. When the piezoelectric element setting step S104 is carried out, the conductive adhesive 79 between the projection 77-7 and the bottom electrode 71 has fluidity before curing.

The softness of the wiring electrode 75 and the cushioning action of the conductive adhesive 79 sufficiently reduce mechanical stress to the piezoelectric element 40. As a result, pressing the projection 77-7 to the bottom electrode 71 never damages the piezoelectric element 40.

The contact plane 77-7a1 is formed to be circular and flat to increase a contact area between the bottom electrode 71 and the wiring electrode 75 and reduce a contact resistance between them.

This results in securing electrical conduction between the electrodes 71 and 75 and improving the reliability of wiring connection to the piezoelectric element 40.

The adhesive curing step S105 applies energy of heat, ultraviolet rays or the like to the head suspension for a predetermined time, to cure the conductive adhesive 79. This step completes the setting of the piezoelectric element 40 to the flexure (wiring member) 15.

Effects of the first head suspension manufacturing method will be explained.

The first method forms the through hole 73 in the flexure (wiring member) 15 and punches the wiring electrode 75 to form the projection 77-7 that faces, through the through hole 73, the bottom electrode (element electrode) 71 of the piezoelectric element 40. The wiring electrode 75 and bottom electrode 71 are brought into contact with each other through the projection 77-7 and are bonded together with the conductive adhesive 79 at the projection 77-7. This secures electrical conduction between the electrodes 71 and 75 and no local stress is applied to the piezoelectric element 40 when wiring connection to the piezoelectric element 40 is carried out.

Accordingly, the first method is capable of conducting wiring work to the piezoelectric element 40 with high reliability without damaging the same.

The conductive adhesive 79 shrinks when cured, to enhance the bonding strength of the electrodes 71 and 75.

If the wiring electrode 75 is a thin plate made by plating copper, the dome-shaped projection 77-7 is unstable when it is punched because the wiring electrode 75 is thin.

For this, the projection forming step S102 bends, simultaneously with the punching of the projection 77-7, the inner circumferential edge 85-7a of the liquid stopper 85-7 and the inner circumferential edge of the insulating layer 15b along the dome-shaped projection 77-7, to stably support the dome-shaped projection 77-5 from the outer circumferential side thereof. This supporting function is surely attained because the liquid stopper 85-7, i.e., the conductive base layer 15a is made of a stainless steel thin plate that is strong and the insulating layer 15b is made of polyimide resin.

A second method of manufacturing a head suspension according to an embodiment of the present invention will be explained in connection with manufacturing the head suspension of the eighth embodiment illustrated in FIG. 8B. This manufacturing method is also applicable to manufacture the head suspensions of the fourth and sixth embodiments.

FIG. 10 is a flowchart illustrating steps of manufacturing the head suspension of the eighth embodiment with sectional views corresponding to the steps and FIG. 11B illustrates punching the wiring electrode 75 into the projection 77-8.

The second method is basically the same as the first method except for the order of steps. Accordingly, specific points of the second method will mainly be explained.

The first head suspension manufacturing method illustrated in FIG. 9 includes the through hole forming step S101, projection forming step S102, conductive adhesive applying step S103, piezoelectric element setting step S104, and adhesive curing step S105 and carries out these steps in this order.

On the other hand, the second head suspension manufacturing method illustrated in FIG. 10 includes a through hole forming step S111, a projection forming step S112, a piezoelectric element (PZT) setting step S113, a conductive adhesive applying step S114, and an adhesive curing step S115 and carries out these steps in this order.

Namely, unlike the first embodiment, the second method carries out, after the piezoelectric element setting step S113, the conductive adhesive applying step S114.

According to the second method, the through hole forming step S111 forms the through hole 73 through the conductive base layer 15a and insulating layer 15b of the flexure (wiring member) 15. At this time, the hole 81 is formed through the wiring layer 15c at a position corresponding to a top 77-8a of a projection 77-8.

The through hole forming step S111 forms the through hole 73 through the conductive base layer 15a and insulating layer 15b with the use of the same technique as that of the first method. The hole 81 in the wiring layer 15c is formed by, for example, etching or punching.

The projection forming step S112 presses the punch 91 having the dome-shaped tip 91b to the back of the wiring electrode 75 having the hole 81 as illustrated in FIGS. 10 and 11B, thereby forming the dome-shaped projection 77-8 on the wiring electrode 75.

In this way, the second method forms the hole 81 in the wiring electrode 75 at a position corresponding to the top 77-8a of the projection 77-8, and thereafter, forms the projection 77-8 by punching. At this time, the hole 81 allows an expansion of the material of the wiring electrode 75, so that the projection 77-8 is smoothly and correctly made.

When carrying out the punching, the top 91a of the punch 91 is aligned with the center 75a of the wiring electrode 75 and the punch 91 is pressed to the back of the wiring electrode 75. At this time, a die to receive the punch 91 may be used.

The projection forming step S112 may be carried out on plural flexures 15 chained in a frame as illustrated in FIG. 12, or on a discrete flexure 15.

Simultaneously with the punching of the projection 77-8, the projection forming step S112 bends the inner circumferential edge 85-8a of the liquid stopper 85-8 and the inner circumferential edge of the insulating layer 15b along the dome-shaped projection 77-8.

The piezoelectric element setting step S113 sets the piezoelectric element 40 on the flexure (wiring member) 15. In connection with this, the height of the projection 77-8 may be set to be larger than a gap with respect to the bottom electrode 71 of the piezoelectric element 40, like the first method.

If the wiring electrode 75 is made of copper of high purity, the projection 77-8 is more or less soft. In this case, the height of the projection 77-8 is set to exceed the gap, so that the top 77-8a of the projection 77-8 may collapse and form the circular and flat contact plane 77-8a1 when the projection is pressed to the bottom electrode 71 of the piezoelectric element 40.

The wiring electrode 75 is made of a material having a relatively low hardness, such as copper. The softness of the wiring electrode 75 sufficiently reduces mechanical stress to the piezoelectric element 40. As a result, pressing the projection 77-8 to the bottom electrode 71 never damages the piezoelectric element 40.

The contact plane 77-8a1 is formed to be circular and flat to increase a contact area between the bottom electrode 71 and the wiring electrode 75 and reduce a contact resistance between them.

This results in securing electrical conduction between the electrodes 71 and 75 and improving the reliability of wiring connection to the piezoelectric element 40.

The conductive adhesive applying step S114 applies the conductive adhesive 79 so as to bury the hole 81.

The adhesive curing step S115 applies energy of heat, ultraviolet rays or the like to the head suspension for a predetermined time, to cure the conductive adhesive 79. This step completes the setting of the piezoelectric element 40 to the flexure (wiring member) 15.

The second method carries out the conductive adhesive applying step S114 after the piezoelectric element setting step S113. This does not limit the present invention. For example, before carrying out the piezoelectric element setting step S113, the conductive adhesive 79 may be applied around the top 77-8a of the projection 77-8 even if the hole 81 is formed in the wiring electrode 75. Instead of around the top 77-8a of the projection 77-8, the conductive adhesive 79 may be applied to a part of the bottom electrode 71 of the piezoelectric element 40 to which the top 77-8a is pressed.

Effects of the second head suspension manufacturing method additional to those of the first head suspension manufacturing method will be explained.

The second method first forms the hole 81 in a part of the wiring electrode 75 to be the top 77-8a of the projection 77-8, and then, punches the wiring electrode 75 into the projection 77-8. Accordingly, the hole 81 allows the wiring electrode 75 to expand during the punching. This results in smoothly and correctly forming the projection 77-8.

After the piezoelectric element setting step S113, the conductive adhesive applying step S114 applies the conductive adhesive 79 to bury the hole 81. Namely, the second method allows the conductive adhesive 79 to be applied from the back of the projection 77-8, to simplify the manufacturing of the head suspension.

A head suspension according to the ninth embodiment of the present invention will be explained with reference to FIG. 13A that is a sectional view illustrating a flexure with a piezoelectric element of a head suspension of the ninth embodiment.

The head suspension of the ninth embodiment is basically the same as that of the first embodiment except for the wiring connection structure for the piezoelectric actuator 12. Accordingly, the characteristic part of the ninth embodiment will be explained with reference to FIG. 13A and in comparison with the first embodiment.

According to the first embodiment (and second to eighth embodiments), the projection 77-1 is formed on the wiring electrode 75, to face the bottom electrode (element electrode) 71 of the piezoelectric element 40 through the through hole 73.

Figure 13A:
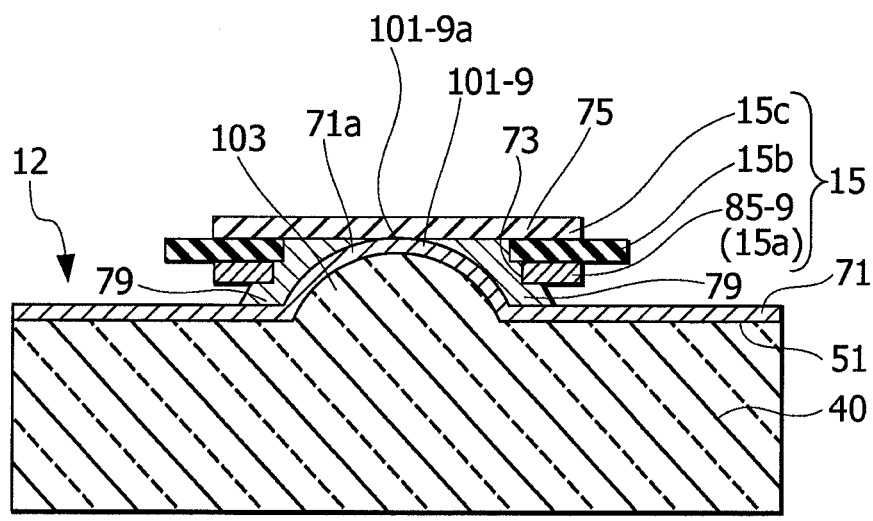
FIG. 13A is a sectional view illustrating a wiring member with a piezoelectric element of a head suspension according to a ninth embodiment of the present invention.

On the other hand, the ninth embodiment illustrated in FIG. 13A forms a projection 101-9 on the piezoelectric element 40, to face the wiring electrode 75 through the through hole 73.

More precisely, the ninth embodiment of FIG. 13A forms a dome-shaped bulge 103 on the piezoelectric element 40. A technique of forming the bulge 103 will be explained later. The bottom electrode 71 is formed to uniformly cover the bottom face of the piezoelectric element 40. Accordingly, the bottom electrode 71 has a swell 71a along the dome-shaped bulge 103.

The bulge 103 of the piezoelectric element 40 and the swell 71a of the bottom electrode 71 form the projection 101-9.

According to the ninth embodiment, the wiring electrode 75 of the flexure (wiring member) 15 is the other electrode to which the projection 101-9 of the bottom electrode 71 as the one electrode faces through the through hole 73. The wiring electrode 75 is flat and has no projection.

A top 101-9a of the projection 101-9 is in contact with the wiring electrode 75. The conductive adhesive 79 is applied around the top 101-9a.

The ninth embodiment brings the element and wiring electrodes 71 and 75 into contact with each other through the projection 101-9 formed on the piezoelectric element 40 and joins the electrodes 71 and 75 together with the conductive adhesive 79.

Effects of the ninth embodiment are similar to those of the first embodiment.

The head suspension according to the ninth embodiment employs the piezoelectric element 40 having the bottom electrode 71 that is provided with the projection 101-9 facing the wiring electrode 75 through the through hole 73. Through the projection 101-9, the bottom electrode 71 and wiring electrode 75 are in contact with to each other. The connected electrodes 71 and 75 are bonded together with the conductive adhesive 79. With the contact and bond, it secures electrical conduction between the electrodes 71 and 75. The wiring connection to the piezoelectric element 40 is achievable without applying local stress onto the piezoelectric element 40.

Namely, the ninth embodiment is capable of carrying out the wiring connection to the piezoelectric element 40 with high reliability without damaging the piezoelectric element 40.

The conductive adhesive 79 shrinks when cured, to enhance the bonding strength of the electrodes 71 and 75.

A head suspension according to the tenth embodiment of the present invention will be explained with reference to FIG. 13B that is a sectional view illustrating a flexure with a piezoelectric element of a head suspension of the tenth embodiment.

The head suspension of the tenth embodiment is basically the same as that of the ninth embodiment illustrated in FIG. 13A except for the wiring connection structure for the piezoelectric actuator 12. Accordingly, the characteristic part of the tenth embodiment will be explained with reference to FIG. 13B and in comparison with the ninth embodiment.

According to the ninth embodiment illustrated in FIG. 13A, the projection 101-9 is formed on the piezoelectric element 40, to face the wiring electrode 75 through the through hole 73.

Figure 13B:
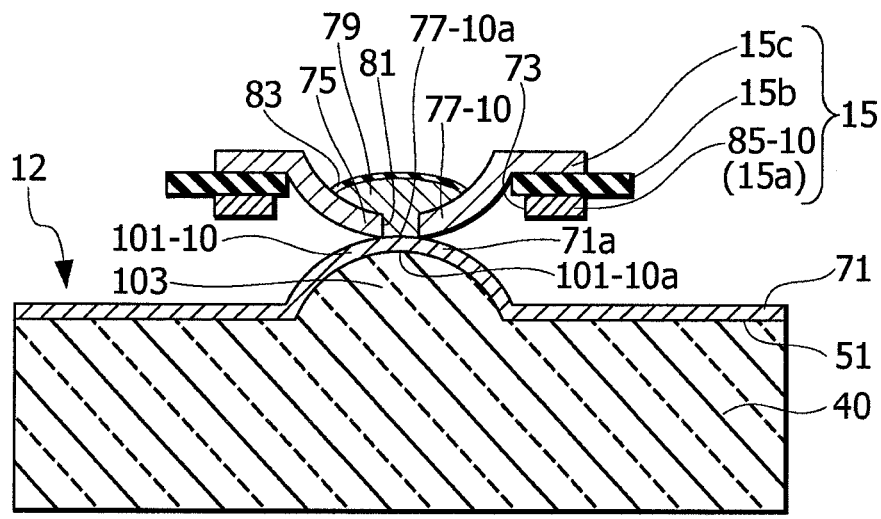
FIG. 13B is a sectional view illustrating a wiring member with a piezoelectric element of a head suspension according to a tenth embodiment of the present invention.

On the other hand, the tenth embodiment illustrated in FIG. 13B forms a projection 101-10 on the piezoelectric element 40, to face the wiring electrode 75 of the flexure (wiring member) 15 through the through hole 73, as well as a projection 77-10 on the wiring electrode 75, to face the bottom electrode (element electrode) 71 of the piezoelectric element 40 through the through hole 73. In this way, the piezoelectric element 40 and wiring electrode 75 have the projections 101-10 and 77-10, respectively.

According to the tenth embodiment, the projection 77-10 of the wiring electrode 75 has a hole 81 at a top 77-10a thereof, to face the bottom electrode 71.

According to the tenth embodiment, the projection 101-10 of the piezoelectric element 40 is made of a bulge 103 of the piezoelectric element 40 and a swell 71a of the bottom electrode 71.

According to the tenth embodiment, the flexure (wiring member) 15 is provided with a liquid stopper 85-10 that is formed by isolating the conductive base layer 15a around the through hole 73 into a ring. The forming technique and functions of the liquid stopper 85-10 are the same as those of the third embodiment.

According to the tenth embodiment, each of the bottom electrode 71 and wiring electrode 75 is the other electrode to which the projection 77-10 and the projection 101-10 face through the through hole 73. Each of the bottom electrode 71 and wiring electrode 75 is also the one electrode.

The tenth embodiment brings the element and wiring electrodes 71 and 75 into contact with each other through the projection 77-10 of the wiring electrode 75 and the projection 101-10 of the bottom electrode 71 and joins the electrodes 71 and 75 together with the conductive adhesive 79.

With the electrodes 71 and 75 being in contact with each other, the hole 81 of the projection 77-10 of the wiring electrode 75 is buried with the conductive adhesive 79 to bond the electrodes 71 and 75 together.

According to the tenth embodiment, the conductive adhesive 79 is covered with a corrosion preventive film 83 to prevent oxidation of the conductive adhesive 79.

Effects of the tenth embodiment additional to those of the ninth embodiment will be explained.

The tenth embodiment brings the element and wiring electrodes 71 and 75 into contact with each other through the projection 77-10 of the wiring electrode 75 and the projection 101-10 of the bottom electrode 71 and joins the electrodes 71 and 75 together with the conductive adhesive 79. Even if a gap between the electrodes 71 and 75 is wide, the tenth embodiment can surely connect them to each other.

A third method of manufacturing a head suspension according to an embodiment of the present invention will be explained in connection with manufacturing the head suspension of the ninth embodiment illustrated in FIG. 13A.

Figure 14:
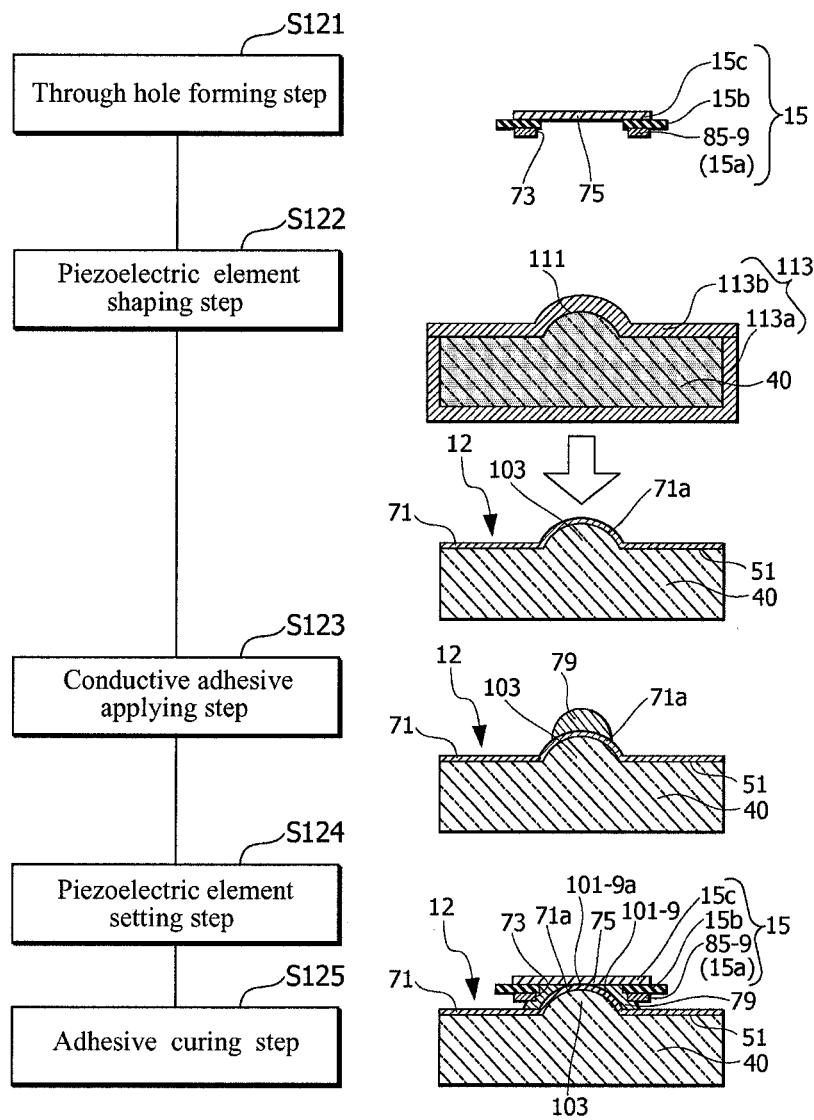
FIG. 14 is a flowchart illustrating a third method of manufacturing a head suspension according to an embodiment of the present invention as well as sectional views corresponding steps of the third method.

FIG. 14 is a flowchart illustrating steps of manufacturing the head suspension of the ninth embodiment with sectional views corresponding the steps.

The third method is basically the same as the first method except the order of steps. Accordingly, specific points of the third method will be explained with reference to FIG. 14 and in comparison with the first head suspension manufacturing method.

The first method illustrated in FIG. 9 includes the through hole forming step S101, projection forming step S102, conductive adhesive applying step S103, piezoelectric element setting step S104, and adhesive curing step S105 and carries out these steps in this order.

On the other hand, the third head suspension manufacturing method illustrated in FIG. 14 includes a through hole forming step S121, a piezoelectric element shaping step S122, a conductive adhesive applying step S123, a piezoelectric element (PZT) setting step S124, and an adhesive curing step S125 and carries out these steps in this order.

Namely, the third method carries out the piezoelectric element shaping step S122 to shape the external shape of the piezoelectric element 40, as the modification of the projection forming step S102 of the first method.

In FIG. 14, the through hole forming step S121 forms the through hole 73 through the conductive base layer 15a and insulating layer 15b of the flexure (wiring member) 15, in the same manner as the first method.

The piezoelectric element shaping step S122 employs a sintering jig 113 having a dome-shaped recess 111 and sinters the piezoelectric element 40 having the dome-shaped bulge 103 on the basis of the shape of the recess 111. The position of the recess 111 corresponds to the position of the wiring electrode 75 when the piezoelectric element 40 is set on the flexure 15.

The sintering jig 113 includes a lower jig 113a and an upper jig 113b put on the lower jig 113a to close the interior space of the lower jig 113a. The recess 111 is formed on an inner wall of the upper jig 113b.

On the sintered piezoelectric element 40, the bottom electrode 71 is formed to uniformly cover the bottom surface 51 including the bulge 103 of the piezoelectric element 40. On a top surface of the piezoelectric element 40, the top electrode 70 (FIG. 2) is formed, to form the piezoelectric actuator 12. The electrodes 70 and 71 are formed by, for example, vapor deposition or spattering.

The conductive adhesive applying step S123 applies the conductive adhesive 79 around the top 101-9a of the projection 101-9.

The piezoelectric element setting step S124 sets the piezoelectric element 40 on the flexure (wiring member) 15. At this time, the top 101-9a of the projection 101-9 of the piezoelectric element 40 is positioned onto the wiring electrode 75.

The top 101-9a of the projection 101-9 is pressed to the wiring electrode 75, to mechanically connect the electrodes 71 and 75 to each other.

The adhesive curing step S125 applies energy of heat, ultraviolet rays or the like to the head suspension for a predetermined time, to cure the conductive adhesive 79. This step completes the setting of the piezoelectric element 40 to the flexure (wiring member) 15.

Effects of the third head suspension manufacturing method are similar to those of the first head suspension manufacturing method.

The third method employs the sintering jig 113 having the recess to form the dome-shaped bulge 103 on the piezoelectric element 40, forms the projection 101-9 with the bulge 103 of the piezoelectric element 40 and the swell 71a of the bottom electrode 71, brings the electrodes 71 and 75 into contact with each other through the projection 101-9, and bonds the electrodes 71 and 75 together with the conductive adhesive 79. The projection 101-9 and conductive adhesive 79 secure electrical conduction between the electrodes 71 and 75. The wiring connection to the piezoelectric element 40 is carried out without applying local stress to the piezoelectric element 40.

The third method is capable of conducting the wiring work to the piezoelectric element 40 with high reliability without damaging the same.

The conductive adhesive 79 shrinks when cured, to enhance the bonding strength of the electrodes 71 and 75.

A head suspension according to the eleventh embodiment of the present invention will be explained with reference to FIG. 15A that is a sectional view illustrating a flexure with a piezoelectric element of a head suspension of the eleventh embodiment.

The head suspension of the eleventh embodiment is basically the same as that of the ninth embodiment illustrated in FIG. 13A except for the wiring connection structure for the piezoelectric actuator 12. Accordingly, the characteristic part of the eleventh embodiment will be explained with reference to FIG. 15A and in comparison with the ninth embodiment.

According to the ninth embodiment illustrated in FIG. 13A, the piezoelectric element 40 is provided with the projection 101-9 to face the wiring electrode 75 through the through hole 73. The projection 101-9 includes the bulge 103 of the piezoelectric element 40 and the swell 71a of the bottom electrode 71.

Figure 15A:
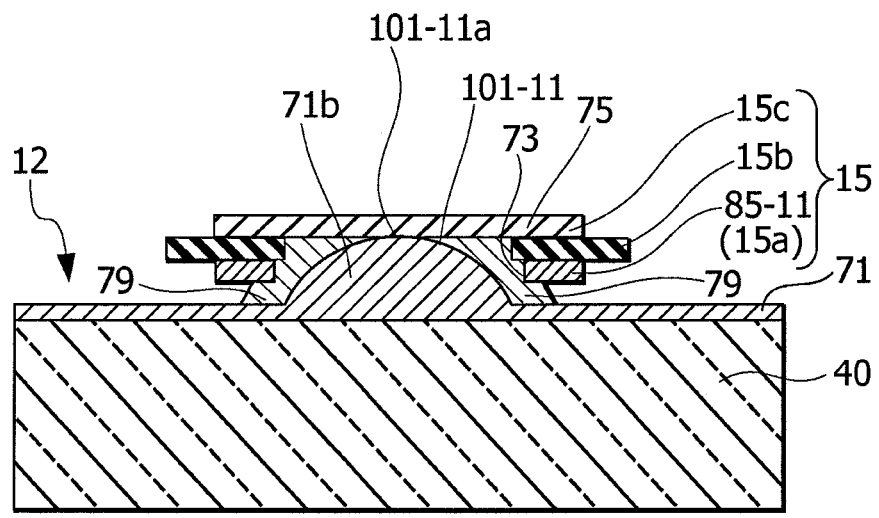
FIG. 15A is a sectional view illustrating a wiring member with a piezoelectric element of a head suspension according to an eleventh embodiment of the present invention.

On the other hand, the eleventh embodiment illustrated in FIG. 15A forms a projection 101-11 by thickening the bottom electrode (element electrode) 71 of the piezoelectric element 40 at a part facing the wiring electrode 75.

According to the eleventh embodiment, the bottom electrode forming surface 51 of the piezoelectric element 40 is flat without a bulge. The bottom electrode 71 layered on the bottom surface 51 is provided with a thick part 71b to form the projection 101-11 at a position corresponding to the wiring electrode 75. The thick part 71b is formed by, for example, thickly applying electrode material to the objective part, or repeatedly applying electrode material thereto, or repeating a vapor deposition of electrode material to the part.

According to the eleventh embodiment, the flexure (wiring member) 15 is provided with a liquid stopper 85-11 that is formed by isolating the conductive base layer 15a around the through hole 73 into a ring. The forming method and functions of the liquid stopper 85-11 are the same as those of the third embodiment.

According to the eleventh embodiment, the wiring electrode 75 is the other electrode to which the bottom electrode 71 as the projection 101-11 of the bottom electrode 71 as the one electrode faces through the through hole 73. The wiring electrode 75 is flat without a projection.

According to the eleventh embodiment, a top 101-11a of the projection 101-11 is in contact with the wiring electrode 75, and around the top 101-11a, the conductive adhesive 79 is applied.

The eleventh embodiment brings the element and wiring electrodes 71 and 75 into contact with each other through the projection 101-11 of the piezoelectric element 40 and joins the electrodes 71 and 75 together with the conductive adhesive 79.

Effect of the eleventh embodiment additional to those of the ninth embodiment will be explained.

The eleventh embodiment employs, instead of the piezoelectric element shaping step S122 of the third head suspension manufacturing method, a step of forming the thick part 71b on the bottom electrode 71 of the piezoelectric element 40, to form the projection 101-11. Namely, the eleventh embodiment forms the projection 101-11 without the sintering jig, thereby simplifying the manufacturing steps.

A head suspension according to the twelfth embodiment of the present invention will be explained with reference to FIG. 15B that is a sectional view illustrating a flexure with a piezoelectric element of a head suspension of the twelfth embodiment.

The head suspension of the twelfth embodiment is basically the same as the eleventh embodiment illustrated in FIG. 15A except for the wiring connection structure for the piezoelectric actuator 12. Accordingly, the characteristic part of the twelfth embodiment will be explained with reference to FIG. 15B and in comparison with the eleventh embodiment.

According to the eleventh embodiment illustrated in FIG. 15A, the wiring electrode 75 is flat and has no projection. With the flat wiring electrode 75, the projection 101-11 of the piezoelectric element 40 is brought in contact.

Figure 15B:
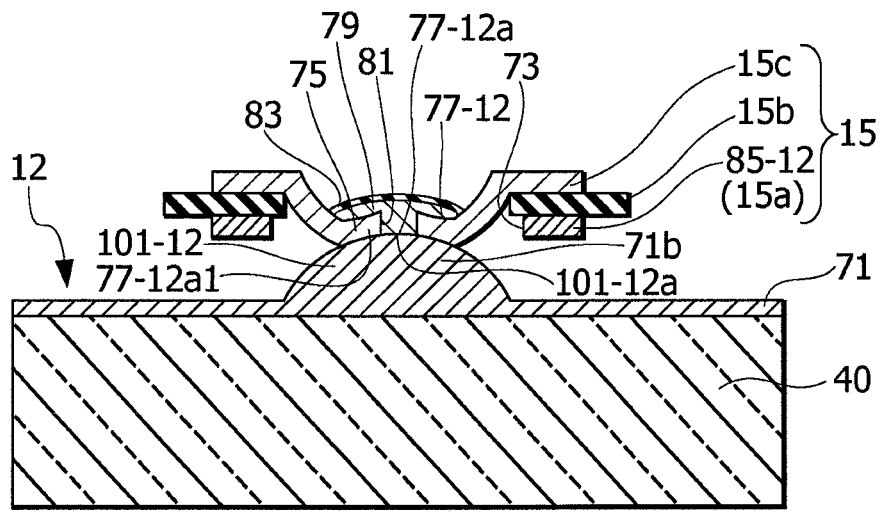
FIG. 15B is a sectional view illustrating a wiring member with a piezoelectric element of a head suspension according to a twelfth embodiment of the present invention.

On the other hand, the twelfth embodiment illustrated in FIG. 15B forms a dome-shaped projection 77-12 on the wiring electrode 75. The projection 77-12 is in contact with a projection 101-12 of the piezoelectric element 40.

According to the twelfth embodiment, the projection 77-12 of the wiring electrode 75 has a hole 81 at a top 77-12a thereof. The hole 81 faces the bottom electrode 71 of the piezoelectric element 40. Around the top 77-12a, there is an inverted dome-shaped receiver 77-12a1 to receive the projection 101-12 of the piezoelectric element 40.

The projection 101-12 of the piezoelectric element 40 is a thick part 71b formed by partly thickening the bottom electrode 71 of the piezoelectric element 40.

According to the twelfth embodiment, the flexure (wiring member) 15 is provided with a liquid stopper 85-12 that is formed by isolating the conductive base layer 15a around the through hole 73 into a ring. The forming method and functions of the liquid stopper 85-12 are the same as those of the third embodiment.

According to the twelfth embodiment, each of the bottom electrode 71 and wiring electrode 75 is the other electrode to which the projection 77-12 and the projection 101-12 face through the through hole 73. Each of the bottom electrode 71 and wiring electrode 75 is also the one electrode.

The twelfth embodiment brings the element and wiring electrodes 71 and 75 into contact with each other through the receiver 77-12a1 of the projection 77-12 on the wiring electrode 75 receiving the projection 101-12 on the bottom electrode 71 of the piezoelectric element 40 and joins the electrodes 71 and 75 together with the conductive adhesive 79.

With the electrodes 71 and 75 being in contact with each other, the hole 81 formed on the projection 77-12 of the wiring electrode 75 is buried with the conductive adhesive 79, to bond the electrodes 71 and 75 together.

The conductive adhesive 79 is covered with a corrosion preventive film 83, to prevent oxidation of the conductive adhesive 79.

Effects of the twelfth embodiment additional to those of the tenth and eleventh embodiments will be explained.

The twelfth embodiment brings the element and wiring electrodes 71 and 75 into contact with each other through the receiver 77-12a1 of the projection 77-12 on the wiring electrode 75 receiving the projection 101-12 on the bottom electrode 71 of the piezoelectric element 40 and joins the electrodes 71 and 75 together with the conductive adhesive 79. This configuration increases a contact area between the electrodes 71 and 75 and reduces a contact resistance between them.

Accordingly, the twelfth embodiment secures electrical conduction between the electrodes 71 and 75 and improves the reliability of wiring connection to the piezoelectric element 40.

A head suspension according to the thirteenth embodiment of the present invention will be explained with reference to FIG. 16A that is a sectional view illustrating a flexure with a piezoelectric element of a head suspension of the thirteenth embodiment.

The head suspension of the thirteenth embodiment is basically the same as that of the twelfth embodiment illustrated in FIG. 15B except for the wiring connection structure for the piezoelectric actuator 12. Accordingly, the characteristic part of the thirteenth embodiment will be explained with reference to FIG. 16A and in comparison with the twelfth embodiment.

According to the twelfth embodiment illustrated in FIG. 15B, the wiring electrode 75 has the dome-shaped projection 77-12. The top 77-12*a* of the projection 77-12 is provided with the inverted dome-shaped receiver 77-12*a*1 to receive the projection 101-12 of the piezoelectric element 40. Namely, to the receiver 77-12*a*1 of the projection 77-12 on the wiring electrode 75, the projection 101-12 of the piezoelectric element 40 is pressed.

Figure 16A:
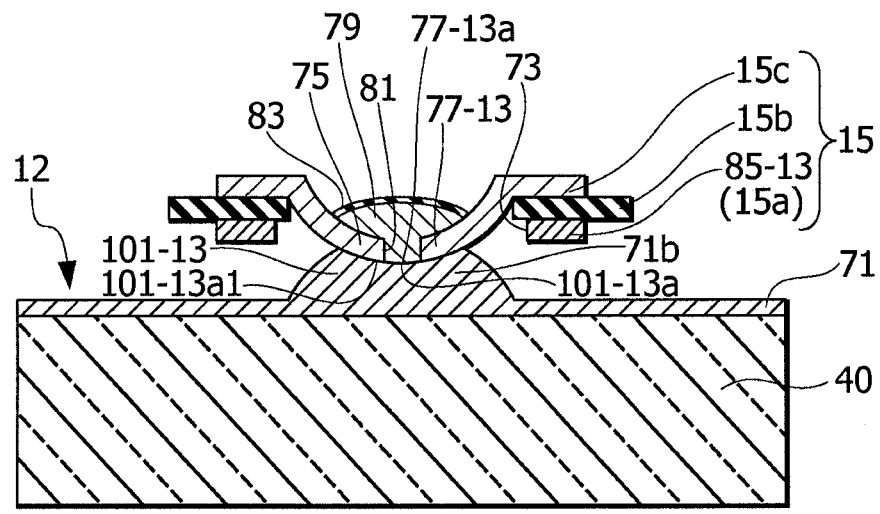
FIG. 16A is a sectional view illustrating a wiring member with a piezoelectric element of a head suspension according to a thirteenth embodiment of the present invention.

On the other hand, the thirteenth embodiment illustrated in FIG. 16A forms a dome-shaped projection 77-13 on the wiring electrode 75. To the projection 77-13 of the wiring electrode 75, a projection 101-13 of the piezoelectric element 40 is pressed. A top 101-13*a* of the projection 101-13 is provided with an inverted dome-shaped receiver 101-13*a*1 to receive the projection 77-13 of the wiring electrode 75. To the receiver 101-13*a*1 on the projection 101-13 of the piezoelectric element 40, the projection 77-13 of the wiring electrode 75 is pressed.

The projection 77-13 of the wiring electrode 75 has a hole 81 at a top 77-13*a* of the projection 77-13, to face the bottom electrode 71 of the piezoelectric element 40.

The projection 101-13 of the piezoelectric element 40 is a thick part 71*b* formed by partly thickening the bottom electrode 71 of the piezoelectric element 40. The thick part 71*b*, i.e., the projection 101-13 has the inverted dome-shaped receiver 101-13*a*1 to receive the projection 77-13 of the wiring electrode 75. The receiver 101-13*a*1 is formed by partly thinning the thick part 71*b*.

According to the thirteenth embodiment, the flexure (wiring member) 15 is provided with a liquid stopper 85-13 that is formed by isolating the conductive base layer 15*a* around the through hole 73 into a ring. The forming method and functions of the liquid stopper 85-13 are the same as those of the third embodiment.

According to the thirteenth embodiment, each of the bottom electrode 71 and wiring electrode 75 is the other electrode to which the projections 77-13 and 101-13 face through the through hole 73. Each of the bottom electrode 71 and wiring electrode 75 is also the one electrode The thirteenth embodiment brings the element and wiring electrodes 71 and 75 into contact with each other through the projection 77-13 of the wiring electrode 75 engaging with the receiver 101-13*a*1 formed on the projection 101-13 of the bottom electrode 71 of the piezoelectric element 40 and joins the electrodes 71 and 75 together with the conductive adhesive 79.

With the electrodes 71 and 75 being in contact with each other, the hole 81 formed on the projection 77-13 of the wiring electrode 75 is buried with the conductive adhesive 79, to bond the electrodes 71 and 75 together.

The conductive adhesive 79 is covered with a corrosion preventive film 83, to prevent oxidation of the conductive adhesive 79.

Effects of the thirteenth embodiment are similar to those of the twelfth embodiment.

The thirteenth embodiment brings the element and wiring electrodes 71 and 75 into contact with each other through the projection 77-13 of the wiring electrode 75 engaging with the receiver 101-13*a*1 formed on the projection 101-13 of the bottom electrode 71 of the piezoelectric element 40 and joins the electrodes 71 and 75 together with the conductive adhesive 79. This configuration increases a contact area between the electrodes 71 and 75 and reduces a contact resistance between them.

Accordingly, the thirteenth embodiment secures electrical conduction between the electrodes 71 and 75 and improves the reliability of wiring connection to the piezoelectric element 40.

A head suspension according to the fourteenth embodiment of the present invention will be explained with reference to FIG. 16B that is a sectional view illustrating a flexure with a piezoelectric element of a head suspension of the fourteenth embodiment.

The head suspension of the fourteenth embodiment is basically the same as that of the thirteenth embodiment illustrated in FIG. 16A except for the wiring connection structure for the piezoelectric actuator 12. Accordingly, the characteristic part of the fourteenth embodiment will be explained with reference to FIG. 16B and in comparison with the thirteenth embodiment.

According to the thirteenth embodiment illustrated in FIG. 16A, the wiring electrode 75 has the dome-shaped projection 77-13. The projection 77-13 of the wiring electrode 75 is in contact with the projection 101-13 of the piezoelectric element 40. The top 101-13*a* of the projection 101-13 is provided with the inverted dome-shaped receiver 101-13*a*1 to receive the projection 77-13 of the wiring electrode 75. To the receiver 101-13*a*1 of the projection 101-13 on the piezoelectric element 40, the projection 77-13 of the wiring electrode 75 is pressed.

Figure 16B:
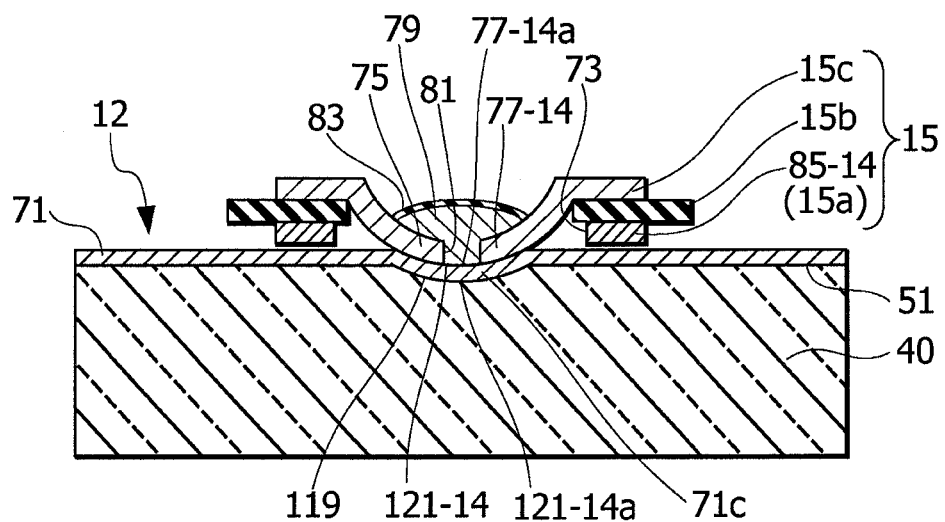
FIG. 16B is a sectional view illustrating a wiring member with a piezoelectric element of a head suspension according to a fourteenth embodiment of the present invention.

On the other hand, the fourteenth embodiment illustrated in FIG. 16B forms a dome-shaped projection 77-14 on the wiring electrode 75. The projection 77-14 is pressed to an inverted dome-shaped receiver 121-14 formed on the piezoelectric element 40. The receiver 121-14 of the piezoelectric element 40 accepts the projection of the wiring electrode 75.

The projection 77-14 of the wiring electrode 75 has a hole 81 at a top 77-14*a* of the projection 77-14, to face the bottom electrode 71 of the piezoelectric element 40.

The piezoelectric element 40 has an inverted dome-shaped recess 119 to receive the projection 77-14 of the wiring electrode 75. A technique of forming the recess 119 on the piezoelectric element 40 will be explained later.

The bottom electrode 71 uniformly covers the bottom face of the piezoelectric element 40. Accordingly, the bottom electrode 71 has a depression 71*c* that extends along the inverted dome-shaped recess 119 on the back of the piezoelectric element 40.

The recess 119 of the piezoelectric element 40 and the depression 71*c* of the bottom electrode 71 form the receiver 121-14.

The top 77-14*a* of the projection 77-14 on the wiring electrode 75 and the top 121-14*a* of the receiver 121-14 on the piezoelectric element 40 are aligned with each other.

According to the fourteenth embodiment, the flexure (wiring member) 15 is provided with a liquid stopper 85-14 that is formed by isolating the conductive base layer 15*a* around the through hole 73 into a ring. The forming method and functions of the liquid stopper 85-14 are the same as those of the third embodiment.

According to the fourteenth embodiment, the bottom electrode 71 of the piezoelectric element 40 is the other electrode to which the projection 77-14 of the wiring electrode 75 as the one electrode faces through the through hole 73.

The fourteenth embodiment brings the element and wiring electrodes 71 and 75 into contact with each other through the projection 77-14 of the wiring electrode 75 engaging with the receiver 121-14 of the piezoelectric element 40 and joins the electrodes 71 and 75 together with the conductive adhesive 79.

With the electrodes 71 and 75 being in contact with each other, the hole 81 formed on the projection 77-14 of the wiring electrode 75 is buried with the conductive adhesive 79, to bond the electrodes 71 and 75 together.

The conductive adhesive 79 is covered with a corrosion preventive film 83, to prevent oxidation of the conductive adhesive 79.

Effects of the fourteenth embodiment are similar to those of the twelfth and thirteenth embodiments.

The fourteenth embodiment brings the element and wiring electrodes 71 and 75 into contact with each other through the projection 77-14 of the wiring electrode 75 engaging with the receiver 121-14 of the piezoelectric element 40 and joins the electrodes 71 and 75 together with the conductive adhesive 79. This configuration increases a contact area between the electrodes 71 and 75 and reduces a contact resistance between them.

Accordingly, the fourteenth embodiment secures electrical conduction between the electrodes 71 and 75 and improves the reliability of wiring connection to the piezoelectric element 40.

A fourth method of manufacturing a head suspension according to an embodiment of the present invention will be explained in connection with manufacturing the head suspension of the fourteenth embodiment illustrated in FIG. 16B.

Figure 17:
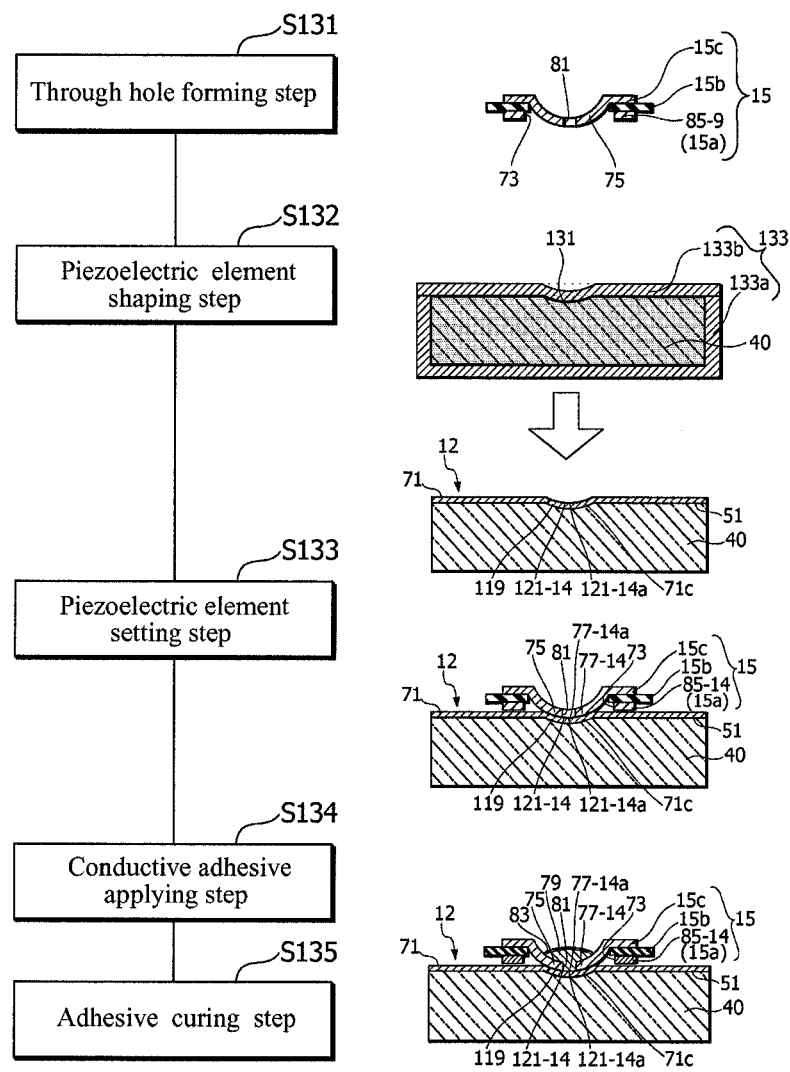
FIG. 17 is a flowchart illustrating a fourth method of manufacturing a head suspension according to an embodiment of the present invention as well as sectional views corresponding steps of the fourth method.

FIG. 17 is a flowchart illustrating steps of the fourth method of manufacturing the head suspension of the fourteenth embodiment with sectional views corresponding to the steps.

The fourth method is basically the same as the third method except the order of steps. Accordingly, specific points of the fourth method will be explained with reference to FIG. 17 and in comparison with the third head suspension manufacturing method.

According to the third method illustrated in FIG. 14, the piezoelectric element shaping step S122 employs the sintering jig 113 having the dome-shaped recess 111. The third method uses the sintering jig 113 to sinter the piezoelectric element 40 so that the piezoelectric element 40 has the dome-shaped bulge 103 at a position corresponding to the wiring electrode 75.

On the other hand, the fourth method illustrated in FIG. 17 includes a piezoelectric element shaping step S132 that employs a sintering jig 133 having a dome-shaped projection 131. The fourth method uses the sintering jig 133 to sinter the piezoelectric element 40 so that the piezoelectric element 40 has the inverted dome-shaped recess 119 at a position corresponding to the wiring electrode 75 based on the shape of the projection 131.

The sintering jig 133 employed in the piezoelectric element shaping step S132 of the fourth method differs in shape from that of the third method.

According to the fourth method of FIG. 17, a through hole forming step S131 forms the through hole 73 through the conductive base layer 15a and insulating layer 15b of the flexure (wiring member) 15. At this time, the hole 81 is formed through the wiring layer 15c at a portion to be shaped in the top 77-14a.

In the through hole forming step S131, the through hole 73 is formed like the first method and the hole 81 is formed like the second method.

The piezoelectric element shaping step S132 employs the sintering jig 133 having the dome-shaped projection 131 and sinters the piezoelectric element 40 having the inverted dome-shaped recess 119 based on the shape of the projection 131. The position of the recess 111 corresponds to the position of the wiring electrode 75 when the piezoelectric element 40 is set on the flexure 15.

The sintering jig 133 includes a lower jig 133a and an upper jig 133b put on the lower jig 133a to close the interior space of the lower jig 133a. The projection 131 is formed on an inner wall of the upper jig 113b.

On the sintered piezoelectric element 40, the bottom electrode 71 is formed to uniformly cover the bottom surface 51 including the recess 119 of the piezoelectric element 40. On a top face of the piezoelectric element 40, the top electrode 70 (FIG. 2) is formed, to form the piezoelectric actuator 12. The electrodes 70 and 71 are formed by, for example, vapor deposition or spattering.

A piezoelectric element setting step S133 sets the piezoelectric element 40 on the flexure (wiring member) 15. At this time, the top 121-14a of the receiver 121-14 of the piezoelectric element 40 is positioned onto the top 77-14a of the projection 77-14 on the wiring electrode 75.

As a result, the projection 77-14 of the wiring electrode 75 is pressed to the receiver 121-14 of the piezoelectric element 40, to mechanically connect the electrodes 71 and 75 to each other.

A conductive adhesive applying step S134 applies the conductive adhesive 79 to bury the hole 81 at the top 77-14a of the projection 77-14.

An adhesive curing step S135 applies energy of heat, ultraviolet rays or the like to the head suspension for a predetermined time, to cure the conductive adhesive 79. This step completes the setting of the piezoelectric element 40 to the flexure (wiring member) 15.

Effects of the fourth head suspension manufacturing method will be explained.

The fourth method employs the sintering jig 133 having the projection 131 to form the dome-shaped recess 119 on the piezoelectric element 40, forms the receiver 121-14 with the recess 119 of the piezoelectric element 40 and the depression 71c of the bottom electrode 71, puts the projection 77-14 of the wiring electrode 75 onto the receiver 121-14 to bring electrodes 71 and 75 into contact with each other, and bonds the electrodes 71 and 75 together with the conductive adhesive 79. With the contact and bond, it secures electrical conduction between the electrodes 71 and 75. The fourth method is capable of carrying out the wiring connection to the piezoelectric element 40 without applying local stress onto the piezoelectric element 40.

Namely, the fourth method carries out the wiring work to the piezoelectric element 40 with high reliability without damaging the same.

The conductive adhesive 79 shrinks when cured, to enhance the bonding strength of the electrodes 71 and 75.

The fourth method engages the projection 77-14 of the wiring electrode 75 with the receiver 121-14 of the piezoelectric element 40 to bring electrodes 71 and 75 into contact with each other, and joins them together with the conductive adhesive 79. This results in increasing a contact area between the electrodes 71 and 75 and reducing a contact resistance between them.

Accordingly, the fourth method secures electrical conduction between the electrodes 71 and 75 and improves the reliability of wiring connection to the piezoelectric element 40.

The fourth method provides the piezoelectric element 40 with the receiver 121-14 to receive the projection 77-14 of the wiring electrode 75. Accordingly, even if a gap between the electrodes 71 and 75 is small, the fourth method correctly connects the electrodes 71 and 75 to each other.

Figure 18A:
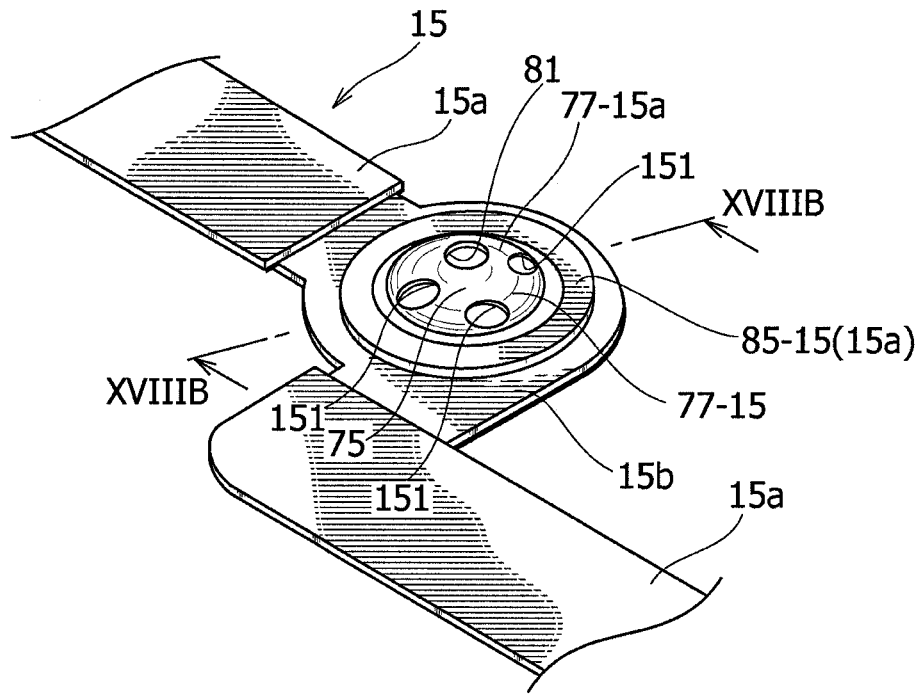
Figure 18B:
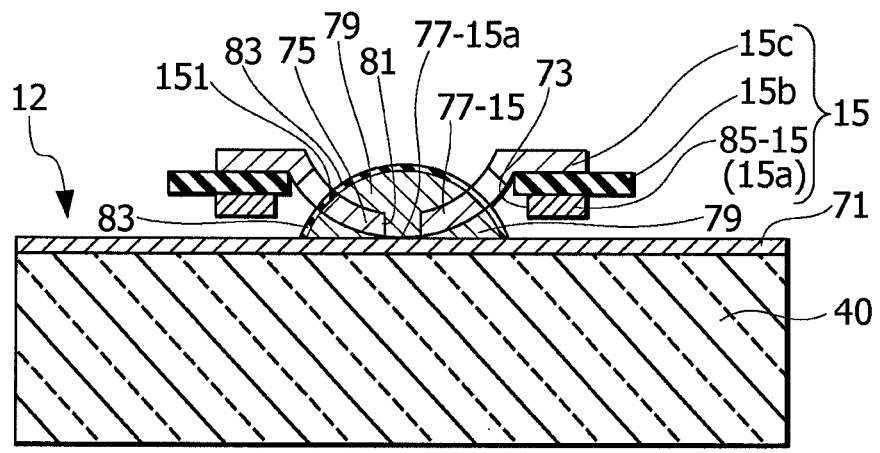

A head suspension according to the fifteenth embodiment of the present invention will be explained with reference to FIGS. 18A and 18B in which FIG. 18A illustrates a flexure of a head suspension of the fifteenth embodiment and FIG. 18B is a sectional view taken along a line XVIIIB-XVIIIB of FIG. 18A with a piezoelectric element.

The head suspension of the fifteenth embodiment is basically the same as that of the fourth embodiment illustrated in FIGS. 6A and 6B except for the wiring connection structure for the piezoelectric actuator 12. Accordingly, the characteristic part of the fifteenth embodiment will be explained with reference to FIGS. 18A and 18B and in comparison with the fourth embodiment.

According to the fourth embodiment illustrated in FIGS. 6A and 6B, the projection 77-4 of the wiring electrode 75 has the one hole 81 at the top 77-4a thereof and no holes at the skirt thereof.

On the other hand, the fifteenth embodiment illustrated in FIGS. 18A and 18B forms one hole 81 at a top 77-15a of a projection 77-15 formed on the wiring electrode 75, to face the bottom electrode (element electrode) 71 of the piezoelectric element 40, as well as four holes 151 at circumferentially regular intervals at the skirt of the projection 77-15.

The holes 151 at the skirt of the projection 77-15 may be formed at irregular intervals and the number of the holes 151 is optional.

According to the fifteenth embodiment, the conductive adhesive 79 is covered with a corrosion preventive film 83. The film 83 is formed by applying a coating liquid between the bottom electrode 71 and the wiring electrode 75 through the holes 151. The film 83 also covers an exposed face of the conductive adhesive 79 between the electrodes 71 and 75, unlike the fourth embodiment.

The fifteenth embodiment nearly entirely covers the conductive adhesive 79 with the corrosion preventive film 83 to prevent oxidation of the conductive adhesive 79.

Any one of the projections 77-2, 77-6, and 77-8 of the second, sixth, and eighth embodiments may have the holes 151 at the skirt thereof in addition to the hole 81 facing the bottom electrode 71 of the piezoelectric element 40.

According to the fifteenth embodiment, the bottom electrode 71 of the piezoelectric element 40 is the other electrode to which the projection 77-15 of the wiring electrode 75 as the one electrode faces through the through hole 73.

The fifteenth embodiment brings the element and wiring electrodes 71 and 75 into contact with each other through the projection 77-15 of the wiring electrode 75 and joins the electrodes 71 and 75 together with the conductive adhesive 79.

Effects of the fifteenth embodiment additional to those of the fourth embodiment will be explained.

The fifteenth embodiment applies the conductive adhesive 79 to bury the hole 81, and thereafter, applies the coating liquid directly to exposed faces of the conductive adhesive 79 on the back of the projection 77-15 and between the electrodes 71 and 75 through the holes 151, thereby substantially entirely forming the corrosion preventive film 83 over the conductive adhesive 79.

Consequently, the fifteenth embodiment protects the conductive adhesive 79 at high level and realizes a highly reliable wiring connection structure.

The present invention is not limited to the above-mentioned embodiments. The embodiments are modifiable without departing from the teachings and technical ideas stipulated in the claims and specification. Head suspensions and methods of manufacturing head suspensions based on such modifications also fall in the scope of the present invention.

For example, the projections and receivers according to the embodiments each have a dome shape. This does not limit the present invention. For example, the projections and receivers may each have any shape such as a conical shape or a cylindrical shape.

According to the embodiments, the liquid stopper has a ring shape. This does not limit the present invention. The liquid stopper may have any shape such as a rectangle or a hexagon each having a central opening.

According to the embodiments, the head suspension has the base plate 11a, piezoelectric actuator 12, load beam 13a, receiver 19a, and the like. This does not limit the present invention. The present invention is applicable to any head suspension provided with a piezoelectric element.

What is claimed is:

1. A head suspension having a base, a piezoelectric element, a load beam, and a wiring member, the wiring member having a conductive base layer, an insulating layer, and a wiring layer layered in this order to supply electric power to the piezoelectric element so that the piezoelectric element deforms to move the load beam relative to the base in a sway direction, the head suspension comprising:
    a wiring electrode formed on the wiring layer of the wiring member;
    an element electrode formed on the piezoelectric element;
    a through hole formed through the conductive base layer and insulating layer of the wiring member to expose the wiring electrode to the element electrode;
    a projection formed on at least one of the wiring electrode and element electrode to face the other of the wiring electrode and element electrode through the through hole and bring the wiring and element electrodes into contact with each other; and
    a conductive adhesive joining the connected electrodes in the contact state together.

2. The head suspension of claim 1, wherein the wiring electrode is provided with the projection, and
    the projection has a dome shape.

3. The head suspension of claim 2, wherein the projection has a hole at a top thereof, the hole facing the element electrode.

4. The head suspension of claim 2, wherein the conductive adhesive is liquid when applied, and
    a liquid stopper is formed on the wiring member around the through hole so as to face the element electrode to prevent the liquid conductive adhesive from diffusing.

5. The head suspension of claim 4, wherein the liquid stopper is formed by isolating a part of the conductive base layer of the wiring member into a ring that surrounds the through hole.

6. The head suspension of claim 5, wherein the liquid stopper has a portion extending along the dome-shaped projection of the wiring electrode.

7. The head suspension of claim 2, wherein the element electrode is provided with a projection facing the projection of the wiring electrode, and
    the projection on the element side has a dome shape.

8. The head suspension of claim 7, wherein the projection of the wiring electrode has, at the top thereof, a dome-shaped receiver.

9. The head suspension of claim 2, wherein the element electrode is provided with a dome-shaped receiver facing the projection of the wiring electrode.

10. The head suspension of claim 1, further comprising:
a corrosion preventive film covering the conductive adhesive.

11. The head suspension of claim 1, wherein the projection has at least one hole at the skirt thereof, the hole facing the element electrode and allowing to form a corrosion preventive film over the conductive adhesive.

12. A method of manufacturing a head suspension of claim 1, the method comprising steps of:
forming the through hole through the conductive base layer and insulating layer of the wiring member;
forming the projection on at least one of the wiring electrode and element electrode so that the projection is faceable to the other electrode through the through hole;
setting the piezoelectric element on the wiring member so that the element electrode and wiring electrode face each other through the through hole and come in contact with each other through the projection; and
joining the wiring electrode and element electrode together with a conductive adhesive.

13. The method of claim 12, wherein the projection forming step presses a punch having a dome-shaped tip to a back of the wiring electrode, thereby forming a dome-shaped projection on the wiring electrode.

14. The method of claim 13, wherein the projection forming step is carried out with respect to a plurality of wiring members that are chained in a frame.

15. The method of claim 13, wherein the projection forming step includes a step of shaping the piezoelectric element, and
the piezoelectric element shaping step sinters the piezoelectric element with a sintering jig having a dome-shaped protrusion at a position corresponding to the projection of the wiring electrode, thereby forming a dome-shaped recess on the piezoelectric element at the position corresponding to the projection of the wiring electrode.

16. The method of claims 13, wherein the projection forming step thins the element electrode on the piezoelectric element at a position corresponding to the projection of the wiring electrode, thereby forming a dome-shaped receiver on the piezoelectric element.

17. The method of claim 12, wherein the projection forming step includes a step of shaping the piezoelectric element, and
the piezoelectric element shaping step sinters the piezoelectric element with a sintering jig having a dome-shaped recess at a position corresponding to the wiring electrode, thereby forming a dome-shaped bulge on the piezoelectric element at the position corresponding to the wiring electrode.

18. The method of claim 12, the projection forming step thickens the element electrode on the piezoelectric element at a position corresponding to the wiring electrode, thereby forming a dome-shaped projection on the piezoelectric element at the position corresponding to the wiring electrode.

* * * * *